(12) United States Patent
Yamamoto et al.

(10) Patent No.: US 12,491,211 B2
(45) Date of Patent: Dec. 9, 2025

(54) THERAPY FOR INTERSTITIAL CYSTITIS BY PLURIPOTENT STEM CELLS

(71) Applicant: TOHOKU UNIVERSITY, Sendai (JP)

(72) Inventors: Tokunori Yamamoto, Nagoya (JP); Shinobu Shimizu, Nagoya (JP); Akira Furuta, Tokyo (JP); Mari Dezawa, Sendai (JP); Yasumasa Kuroda, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 759 days.

(21) Appl. No.: 17/773,556

(22) PCT Filed: Oct. 30, 2020

(86) PCT No.: PCT/JP2020/040963
§ 371 (c)(1),
(2) Date: Apr. 29, 2022

(87) PCT Pub. No.: WO2021/085639
PCT Pub. Date: May 6, 2021

(65) Prior Publication Data
US 2022/0387507 A1 Dec. 8, 2022

(30) Foreign Application Priority Data
Oct. 31, 2019 (JP) .................. 2019-199184

(51) Int. Cl.
*A61K 35/28* (2015.01)
*A61K 35/545* (2015.01)
*A61P 13/10* (2006.01)

(52) U.S. Cl.
CPC ............ *A61K 35/28* (2013.01); *A61K 35/545* (2013.01); *A61P 13/10* (2018.01)

(58) Field of Classification Search
None
See application file for complete search history.

(56) References Cited

U.S. PATENT DOCUMENTS

| | | | |
|---|---|---|---|
| 2011/0070647 A1* | 3/2011 | Dezawa | A61P 15/00 435/378 |
| 2015/0196600 A1 | 7/2015 | Yoshida et al. | |
| 2016/0058800 A1* | 3/2016 | Yoshida | A61K 35/545 435/325 |
| 2017/0128498 A1* | 5/2017 | Yoshida | A61P 13/02 |

FOREIGN PATENT DOCUMENTS

| | | |
|---|---|---|
| JP | 2012-139246 A | 7/2012 |
| JP | 2015-160820 A | 9/2015 |
| JP | 2016-8198 A | 1/2016 |
| WO | WO 2014/027684 A1 | 2/2014 |

OTHER PUBLICATIONS

International Search Report issued Dec. 28, 2020, in PCT/JP2020/040963, citing documents 11-14, 20-26 therein, 3 pages.
Furuta, A., et al., "Bladder wall injection of mesenchymal stem cells ameliorates bladder inflammation, overactivity, and nociception in a chemically induced interstitial cystitis-like rat model", International Urogynecology Journal, 2018, vol. 29, p. 1615-1622 (Mar. 6, 2018).
Hirose, Y., et al., "Injection of Dental Pulp Stem Cells Promotes Healing of Damaged Bladder Tissue in a Rat Model of Chemically Induced Cystitis", Cell Transplantation, 2016, vol. 25, p. 425-436.
Dezawa M., "Newly discovered human bio-derived pluripotent stem cells, Muse cells: potential for nerve regenerative medicine", Peripheral Nerve, 2012, vol. 23, p. 135-139.
Lander, E.B., et al., "Personal cell therapy for interstitial cystitis with autologous stromal vascular fraction stem cells", Therapeutic Advances in Urology, 2019, vol. 11, p. 1-9.
Xie, J., et al., "Umbilical cord-derived mesenchymal stem cells alleviated inflammation and inhibited apoptosis in interstitial cystitis via AKT/mTOR signaling pathway", Biochemical and Biophysical Research Communications, 2018, vol. 495, p. 546-552.
Kim, B.S., et al., "Efficacy of combination therapy with pentosan polysulfate sodium and adipose tissue-derived stem cells for the management of interstitial cystitis in a rat model", Stem Cell Research, 2020, vol. 45, p. 1-7.
Furuta, A., et al., "6. The usefulness of human Muse cell transplantation for an interstitial cystitis-like rat model", Journal of Interstitial Crystitis, 2019, vol. 15, p. 13.

* cited by examiner

*Primary Examiner* — Blaine Lankford
(74) *Attorney, Agent, or Firm* — Oblon, McClelland, Maier & Neustadt, L.L.P.

(57) ABSTRACT

The purpose of the present invention is to provide a novel medical application using pluripotent stem cells in regenerative medicine. The present invention provides a cell formulation and pharmaceutical composition that are for amelioration and therapy for frequent urination and bladder pain caused by the inflammation of the bladder and that contain SSEA-3 positive pluripotent stem cells isolated from cultured mesenchymal cells or a mesenchymal tissue of a living organism. The cell formulation according to the present invention is considered to be based on a mechanism in which, for example, Muse cells are administered against interstitial cystitis having the abovementioned disorders to be successfully engrafted into affected bladder tissue, whereby the disorders are ameliorated and treated.

9 Claims, 16 Drawing Sheets

TNFα

*; P<0.05, **; P<0.01 vs Control
†; P<0.05 vs Muse

IL-1α

*; P<0.05, **; P<0.01 vs Control

Bladder pain (respiratory arrest frequency) (times)
(*:p<0.05 Wilcoxon test)

c-Fos Positive Cells
(**:p<0.01 Wilcoxon test)

THERAPY FOR INTERSTITIAL CYSTITIS BY PLURIPOTENT STEM CELLS

CROSS-REFERENCE TO RELATED APPLICATIONS

The present application is a 35 U.S.C. § 371 national stage patent application of International patent application PCT/JP2020/040963, filed on Oct. 30, 2020, which is based on and claims the benefits of priority to Japanese Application No. 2019-199184, filed on Oct. 31, 2019.

FIELD

The present invention relates to a cell preparation for regenerative medicine. More specifically, it relates to an effective cell preparation for treatment of interstitial cystitis containing pluripotent stem cells, and to a novel treatment method.

BACKGROUND

Regenerative medicine using stem cells is showing promise as an alternative mode of therapy for diseases that are difficult to treat with conventional medical care. A large number of diseases are possible or potential targets of regenerative medicine, and much research is being conducted with the goal of applying such treatments in the clinic. Interstitial cystitis is one such disease that is difficult to treat.

Interstitial cystitis is a chronic bladder disease of unknown origin, characterized by pain such as pelvic pain and lower urinary tract symptoms including increased urinary frequency and urgency. The term has conventionally been used to encompass the complex of symptoms including bladder pain syndrome (BPS) (NPL 1) or painful bladder syndrome (PBS) (NPL 2) as well as interstitial cystitis, but more recently interstitial cystitis tends to be distinguished from Hunner-type interstitial cystitis or bladder pain syndrome (NPL 3).

Establishing a method of treatment for interstitial cystitis that can reduce urination pain and shorten urinary interval for interstitial cystitis patients will considerably improve the quality of life (QOL) of patients. At the current time, however, no method or drug has been provided that is effective for improving or treating interstitial cystitis.

Recently in the field of regenerative medicine, research has been conducted on cell therapy using stem cells for a variety of diseases, and embryonic stem cells (ES cells), nerve stem/progenitor cells (NSPC), induced pluripotent stem cells (iPS cells) and umbilical cord blood stem cells (UCBC) have become well known as types of stem cells that are expected to have potential in clinical applications. The bone marrow-derived mesenchymal cells (MSCs) fraction has been isolated from adults, and it is known to have the ability to differentiate into bone, cartilage, adipocytes, neurons and skeletal muscle, for example (NPLs 4 and 5). However, MSCs are heterogeneous cell populations, the nature of their differentiation potency is unknown, and there is a wide range of variation in their potential therapeutic effect. iPS cells (PTL 1) have been reported as adult pluripotent stem cells, but since establishing iPS cells requires the very complex procedure of introducing specific genes or specific compounds into the skin fibroblast fraction (mesenchymal cell fraction) of somatic cells, while iPS cells could also have high tumor-forming potential, and therefore high hurdles still stand in the way of their clinical application.

Research by Prof. Dezawa, one of the present inventors, has demonstrated that the pluripotency of the mesenchymal cells fraction is exhibited by pluripotent stem cells (Multi-lineage-differentiating Stress Enduring cells, or Muse cells) that express SSEA-3 (Stage-Specific Embryonic Antigen-3) as a surface antigen, which are present in the mesenchymal cell fraction and can be obtained without operation of induction and that this holds potential for application in treatment of diseases by tissue regeneration. It has also been found that Muse cells can be enriched by treating the mesenchymal cells fraction with one or more off different types of stress treatments (PTL 2, NPL 6). However, it has not yet been demonstrated that the expected therapeutic effect can be obtained using Muse cells for amelioration and/or treatment of interstitial cystitis.

CITATION LIST

Patent Literature

[PTL 1] Japanese Patent Publication No. 4183742
[PTL 2] International Patent Publication No. WO2011/007900

Non Patent Literature

[NPL 1] van der Merve et al., European Urology 53(2008): 60-67
[NPL 2] MacDiarmid S A et al., Rev Urol 2007, 9(1):9-16
[NPL 3] "Treatment Guidelines for Interstitial cystitis and Bladder Pain Syndrome", Society of Interstitial Cystitis of Japan/The Japanese Urological Association (ed.), First Edition, 2019, RichHill Medical Inc.)
[NPL 4] Dezawa, M., et al., J. Clin. Invest., Vol. 113, p. 1701-1710(2004)
[NPL 5] Dezawa, M., et al., Science, Vol. 309, p. 314-317 (2005)
[NPL 6] Wakao, S, et al., Proc. Natl. Acad. Sci. USA, Vol. 108, p. 9875-9880(2011)

SUMMARY

Technical Problem

It is an object of the present invention to provide a novel medical use for pluripotent stem cells in regenerative medicine. More specifically, it is an object of the present invention to provide a cell preparation and pharmaceutical composition that include Muse cells and are effective for treating interstitial cystitis, as well as a novel treatment method.

Solution to Problem

The present inventors have created a Hunner-type interstitial cystitis (HIC) model by injecting rat bladders with hydrochloric acid, and have completed this invention upon finding that interstitial cystitis is improved by injecting Muse cells into the bladder wall.

Specifically, the present invention provides the following.
[1] A cell preparation for amelioration and/or treatment of interstitial cystitis, comprising pluripotent stem cells positive for SSEA-3 isolated from mesenchymal tissue of a body or cultured mesenchymal cells.

[2] The cell preparation according to [1] above, comprising a cell fraction wherein the pluripotent stem cells positive for SSEA-3 have been concentrated by external stress treatment.

[3] The cell preparation according to [1] or [2] above, wherein the pluripotent stem cells are CD105-positive

[4] The cell preparation according to any one of [1] to [3] above, wherein the pluripotent stem cells are CD117-negative and CD146-negative.

[5] The cell preparation according to any one of [1] to [4] above, wherein the pluripotent stem cells are CD117-negative, CD146-negative, NG2-negative, CD34-negative, vWF-negative and CD271-negative.

[6] The cell preparation according to any one of [1] to [5] above, wherein the pluripotent stem cells are CD34-negative, CD117-negative, CD146-negative, CD271-negative, NG2-negative, vWF-negative, Sox10-negative, Snail-negative, Slug-negative, Tyrp1-negative and Dct-negative.

[7] The cell preparation according to any one of [1] to [6], wherein the pluripotent stem cells have all of the following properties:
(i) low or non-existent telomerase activity;
(ii) having the ability to differentiate into any of the three germ layers;
(iii) exhibiting no neoplastic proliferation; and
(iv) having self-renewal ability.

[8] The cell preparation according to any one of [1] to [7], wherein the bladder disorder associated with the interstitial cystitis is selected from the group consisting of frequent urination, increased urinary motivation, urinary urgency, bladder pain, urethral pain, pelvic pain, perineal pain and coital pain.

[9] The cell preparation according to any one of [1] to [8] above, wherein the pluripotent stem cells have the ability to engraft into bladder tissue.

[10] The cell preparation according to any one of [1] to [9] above, wherein the pluripotent stem cells are administered to a patient suffering from interstitial cystitis at from approximately $1\times10^5$ cells/individual to approximately $1\times10^9$ cells/individual, as the therapeutically effective amount.

[11] The cell preparation according to any one of [1] to [10] above, wherein the pluripotent stem cell are administered to a patient suffering from interstitial cystitis in an amount of about $1\times10^5$ cells/kg to about $1\times10^8$ cells/kg by body weight per individual patient, as the therapeutically effective dose.

Advantageous Effects of Invention

The present invention can drastically reduce interstitial cystitis in subjects suffering from interstitial cystitis, by a bladder tissue-regenerating mechanism in which Muse cells are directly injected into the affected site or through a vein to allow their engrafting into damaged bladder tissue, and the Muse cells differentiate to bladder tissue-forming cells within the tissue.

DESCRIPTION OF EMBODIMENTS

Figure 1:
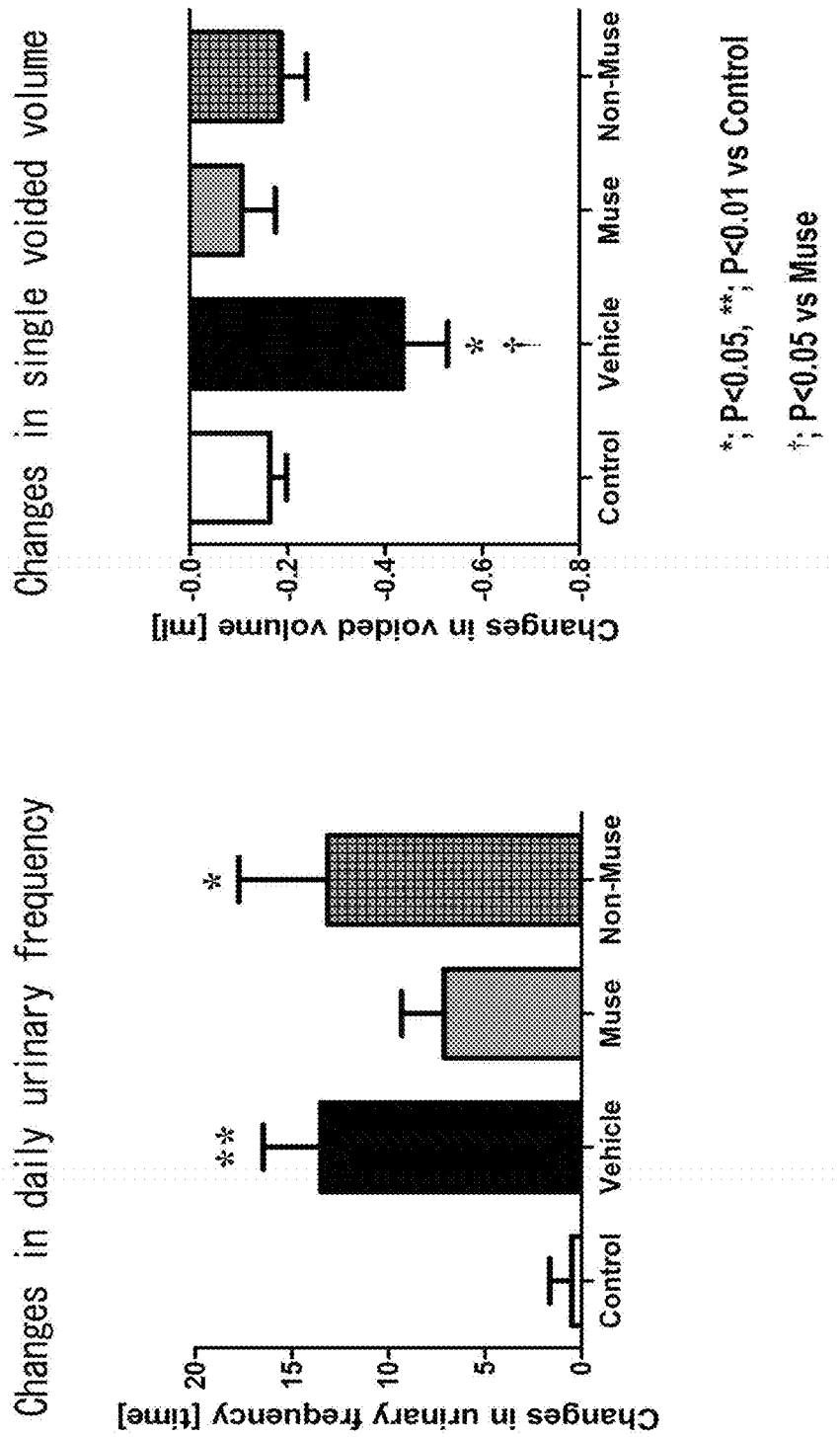
FIG. 1 shows the results of measuring change in urination frequency and urination volume per day in a Hunner-type interstitial cystitis (HIC) rat model.

The present invention relates to a cell preparation and pharmaceutical composition for amelioration and/or treatment of the intractable condition of interstitial cystitis, which contains SSEA-3 positive pluripotent stem cells (Muse cells), and to a novel treatment method. The present invention will now be explained in greater detail.

1. Applicable Diseases and their Diagnosis

The present invention is intended for amelioration and treatment of interstitial cystitis using a cell preparation or pharmaceutical composition containing SSEA-3 positive pluripotent stem cells (Muse cells). The definition of interstitial cystitis is based on "Medical treatment guidelines for interstitial cystitis and bladder pain syndrome" (ed: Society of Interstitial Cystitis of Japan/The Japanese Urological Association, first edition, 2019, RichHill Medical Inc.) (also referred to hereunder as "treatment guidelines"). According to the treatment guidelines, Interstitial Cystitis/Bladder Pain Syndrome (IC/BPS) is defined as "a condition associated with chronic pelvic pain, sense of pressure or discomfort associated with the bladder, with lower urinary tract symptoms such as increased urinary motivation and frequent urination, without other conditions that may have similar symptoms". It is often misdiagnosed as bladder infection, neoplasm, stones or overactive bladder. IC/BPS with Hunner's lesions is referred to as Hunner-type interstitial cystitis or Hunner's interstitial cystitis (HIC), while other types are referred to as bladder pain syndrome (BPS).

Hunner's lesions are the erosive lesions characteristic of Hunner-type interstitial cystitis, pathologically distinguished from ulceration by lacking depressions at the lesion sites. The red lesions have flat or moderate bulges and relatively distinct boundaries, and the color tone is relatively light if free of bleeding. Tips, side walls and back walls, as well as their boundaries, are frequently seen, sometimes connected and crossing left-to-right. Scarring and vascular hyperplasia are commonly seen around the lesions, with convergence of the blood vessels or scars with the lesions.

(1) Interstitial Cystitis

Interstitial cystitis (IC) is a term used since the 19th century and currently has no internationally accepted definition. The NIDDK (National Institute of Diabetes and Digestive and Kidney Diseases) proposed the following criteria (Table 1) in 1999. However, this does not constitute a disease definition but merely proposes standards to be established for incorporating patient symptoms into clinical research.

TABLE 1

Criteria for diagnosing interstitial cystitis according to NIDDK (summary)

| | |
|---|---|
| Diagnosed parameter | Hunner ulcer* or petechia** with bladder pain or urinary urgency |
| Excluded parameters | <18 yrs old, cystometrography: vesical capacity of ≥350 mL, without strong urinary desire with injection up to 150 mL, involuntary contraction, disease period <9 months, <1 nocturnal urination, <8 daytime urinations, symptoms reduced by antibacterial/anti-cholinergic agents, lower urinary tract infection (within 3 months), bladder or ureter stone, genital herpes, benign or malignant bladder tumor, urethral cancer, gynecologic cancer, urethral diverticulum, vaginitis, tuberculous cystitis, radiation-induced cystitis, cyclophosphamide-induced cystitis |

*"Hunner ulcer" as in the original.
**Petechia is considered present if at least 3 of the 4 defined parts of the bladder wall (front, rear, left, right) have 10 or more hemorrhage points in each part.

Clinical criteria are based on the U.S. Interstitial Cystitis Data Base (ICDB) of accumulated cases begun in 1997. According to the ICDB criteria, cystoscope findings of "Hunner's ulcers or petechia" according to the NIDDK criteria are not essential. However, this is too poorly specific to allow diagnosis by symptoms alone. In the U.S., social factors including the high cost of endoscopy is thought to be one reason for not including endoscope findings.

According to the definition set out by the Japan 2007 Treatment Guidelines, interstitial cystitis (IC) is "a disease of nonspecific chronic inflammation of the bladder and presenting symptoms such as frequent urination, increased urinary motivation, urinary urgency and bladder pain". However, not all IC/BPS cases are accompanied by inflammation. IC has not been defined in the ESSIC or AUA guidelines published in 2008 and afterwards. Instead of referring to IC, it is included with Bladder Pain Syndrome (BPS) and indicated as IC/BPS in combination with BPS. In the ICI report of 2018, only Hunner's lesions are referred to as IC, while it is stated that IC should be treated as a completely different disease from BPS. In other words, IC is defined as Hunner's lesions.

(2) Hunner-Type Interstitial Cystitis and Non-Hunner-Type Interstitial Cystitis

According to the NIDDK criteria (Table 1), cystoscope findings such as Hunner's ulcers (Hunner's lesions) and petechia or mucosal bleeding after distension (MBAD) are considered to be characteristic to IC. IC with Hunner's lesions is referred to as classical interstitial cystitis, ulcerative interstitial cystitis, Hunner-type interstitial cystitis or (Hunner's) interstitial cystitis. Conditions without Hunner's lesions but with petechia or MBAD are considered to be non-classical interstitial cystitis, non-ulcerative interstitial cystitis or non-Hunner-type interstitial cystitis (NHIC).

HIC and NHIC are completely different in terms of pathological findings. With HIC, ablation of the bladder epithelium or strong inflammation of the lamina propria is seen throughout the bladder. With NHIC, however, virtually no such epithelial ablation or inflammation is observed. Augmented gene expression of inflammation-associated molecules is also seen in HIC. HIC and NHIC also present totally different profiles in comprehensive gene expression analysis. According to common clinical indicators, however, HIC has somewhat more severe symptoms with more complications in older age groups, making it difficult to draw a clear distinction. Some are of the opinion that the petechia characteristic of NHIC are pathologically unimportant and should not be part of the IC criteria. When symptoms are present but Hunner's lesions or petechia cannot be confirmed by cystoscope, i.e. neither HIC nor NHIC can be diagnosed, the condition is referred to as "hypersensitive bladder" according to East Asian treatment guidelines.

(3) Syndrome

The term "syndrome" is defined by the International Continence Society (ICS) as "a combination of different symptoms which alone do not allow for proper diagnosis". A functional disorder without a clearly definable cause, assuming that obvious local pathology is completely excluded by ordinary examination". It includes two subclassifications: "Genital organ or urinary tract syndrome", and "Syndrome with symptoms suggesting lower urinary tract dysfunction", with the former including painful bladder syndrome and pelvic pain syndrome. Overactive bladder syndrome and lower urinary tract symptoms suggesting obstruction of the bladder outlet are included in the latter.

(4) Clinical Observations

Based on clinical observations, (i) the patient exhibits symptoms such as bladder pain or frequent urination, (ii) infection, stones, cancer or bladder-surrounding lesions can be excluded, (iii) the patient exhibits some cystoscope findings indicating Hunner's lesions but also partially exhibits post-expansion petechia without Hunner's lesions, or (iv) the previous 3 types are difficult to diagnosis with common clinical indicators such as symptoms.

According to recent scientific knowledge, (i) Hunner's lesions are clearly inflammatory disease, based on both histology and gene expression, and therefore treatment responsiveness also differs from other conditions, and (ii) petechia or MBAD are not associated with symptom severity or gene expression and have weak clinical significance.

For identification of patients, BPS or IC/BPS is widely used internationally instead of IC. However, BPS is a symptomatic syndrome and cannot include patients with organic lesions such as Hunner's lesions. BPS is also not registered in the ICD, and bladder pain syndrome is not listed in the disease names for insurance purposes (whereas interstitial cystitis is listed). However since IC/BPS more comprehensively includes IC, there is no contradiction in the insurance system in this regard.

TABLE 2

Definition of terms used in treatment guidelines

| Term | Definition |
| --- | --- |
| Interstitial cystitis/ bladder pain syndrome | Chronic pelvic pain associated with bladder, sense of pressure or discomfort, lower urinary tract symptoms such as increased urinary motivation or frequent urination, no other conditions with similar symptoms |
| Hunner-type interstitial cystitis | IC/BPS with Hunner's lesions |
| Bladder pain syndrome | IC/BPS without Hunner's lesions |
| Hypersensitive bladder symptoms | Chronic pelvic pain associated with bladder, sense of pressure or discomfort, lower urinary tract symptoms such as increased urinary motivation or frequent urination |

According to the present invention, the cell preparation and pharmaceutical composition described below are administered to (or "transplanted in", as it may also be termed hereunder) a subject for treatment of the applicable disease, to allow amelioration and/or treatment of the applicable disease. The term "amelioration" here means alleviating or suppressing progression of symptoms accompanying interstitial cystitis, and preferably it means alleviating symptoms to a level such that they are not a problem for daily living activities. The term "treatment" refers to suppressing or completely eliminating symptoms of interstitial cystitis.

2. Cell Preparation and Pharmaceutical Composition (1) Pluripotent Stem Cells

The pluripotent stem cells to be used in the cell preparation and pharmaceutical composition of the present invention are typically cells whose existence in the human body was discovered by Prof. Dezawa, one of the present inventors, and which are named "Muse (Multilineage-differentiating Stress Enduring) cells". Muse cells can be obtained from bone marrow fluid and adipose tissue (Ogura, F., et al., Stem Cells Dev., Nov. 20, 2013 (Epub) (published on Jan. 17, 2014)) or from skin tissue such as dermal connective tissue, and they are widely dispersed throughout the connective tissue of various organs. The cells have the properties of both pluripotent stem cells and mesenchymal stem cells, and are identified as being double-positive for the cell surface markers "SSEA-3 (Stage-specific embryonic antigen-3)" and "CD105". Therefore, Muse cells or cell populations containing Muse cells, for example, can be isolated from body tissue using these antigen markers. Muse cells are also stress-tolerant, and can be concentrated from mesenchymal tissue or cultured mesenchymal cells by different types of stress treatments. A cell fraction with Muse cells enriched by stress treatment may be used as the cell preparation of the present invention. The methods of separation and identification of Muse cells, and their features, are disclosed in detail in International Patent Publication No. WO2011/007900. Also, as reported by Wakao et al. (2011, ibid.), when mesenchymal cells are cultured from the bone marrow or skin and used as a parent population of Muse cells, all of the SSEA-3 positive cells are also CD105-positive. Consequently, when Muse cells are isolated from mesenchymal tissue of a body or cultured mesenchymal stem cells for the cell preparation and pharmaceutical composition of the present invention, the Muse cells may be used after purification with SSEA-3 alone as the antigen marker. Throughout the present specification, pluripotent stem cells (Muse cells) or a cell population containing Muse cells, isolated from mesenchymal tissue of a body or cultured mesenchymal tissue using SSEA-3 as the antigen marker, and which can be used in a cell preparation and pharmaceutical composition for amelioration and/or treatment of various disorders and symptoms associated with interstitial cystitis, may be referred to simply as "SSEA-3 positive cells". Also throughout the present specification, "non-Muse cells" refers to cells that are present in mesenchymal tissue of a body or cultured mesenchymal tissue, and are the remainder of "SSEA-3 positive cells". In the Examples provided below, the non-Muse cells used are cell populations obtained by removing the SSEA-3 and CD105-positive cells from MSC by the method described in International Patent Publication No. WO2011/007900 for separation and identification of human Muse cells.

In brief, Muse cells or a cell population containing Muse cells can be isolated from body tissue (for example, mesenchymal tissue) using only antibody for the cell surface marker SSEA-3, or using antibodies for both SSEA-3 and CD105. The term "body" here means "mammalian body". According to the present invention, the "body" does not include a fertilized ovum or an embryo at a developmental stage before the blastocyst stage, but it does include an embryo at the developmental stage from the blastocyst stage onward, including the fetus or blastocyst. The mammal is not limited and may be a primate such as human or monkey, a rodent such as a mouse, rat, or guinea pig, rabbit, or a cat, dog, sheep, pig, cow, horse, donkey, goat or ferret. The Muse cells to be used in the cell preparation and pharmaceutical composition of the present invention are clearly distinguished from embryonic stem cells (ES cells) or iPS cells based on separation from body tissue using a direct marker. The term "mesenchymal tissue" refers to tissue from the bone, synovial membrane, fat, blood, bone marrow, skeletal muscle, dermis, ligament, tendon, dental pulp, umbilical cord or umbilical cord blood, or tissues present in various organs. For example, the Muse cells may be obtained from the bone marrow or skin or adipose tissue. Preferably, mesenchymal tissue of a body is harvested and the Muse cells are isolated from the tissue and used. The separating means mentioned above may be used to separate Muse cells from cultured mesenchymal cells such as fibroblasts or bone marrow-derived MSCs. The Muse cells to be used for the cell preparation and pharmaceutical composition of the present invention may be either autologous or allogenic with respect to the recipient.

As mentioned above, Muse cells or a cell population containing Muse cells can be isolated from body tissue using SSEA-3 positivity, or double positivity for SSEA-3 and CD105, as indicators, but human adult skin is known to include various types of stem cells and progenitor cells. However, Muse cells are not identical to these cells. Such stem cells and progenitor cells include skin-derived precursors (SKP), neural crest stem cells (NCSC), melanoblasts (MB), perivascular cells (PC), endothelial precursor cells (EP) and adipose-derived stem cells (ADSC). Muse cells can be separated out as being "non-expressing" for the markers unique to these cells. More specifically, Muse cells can be separated by using non-expression for at least one, and for example, 2, 3, 4, 5, 6, 7, 8, 9, 10 or 11 among 11 markers selected from the group consisting of CD34 (EP and ADSC marker), CD117 (c-kit) (MB marker), CD146 (PC and ADSC marker), CD271 (NGFR) (NCSC marker), NG2 (PC marker), vWF factor (von Willebrand factor) (EP marker), Sox10 (NCSC marker), Snail (SKP marker), Slug (SKP marker), Tyrp1 (MB marker) and Dct (MB marker). As a non-limitative example, non-expression of CD117 and CD146 may be used as the indicator for separation, non-expression of CD117, CD146, NG2, CD34, vWF and CD271 may be used as the indicator, or non-expression of all of the aforementioned 11 markers may be used as the indicator for separation.

The Muse cells having the aforementioned features to be used for the cell preparation and pharmaceutical composition of the present invention may have at least one property selected from the group consisting of the following:
(i) low or non-existent telomerase activity;
(ii) having the ability to differentiate into any of the three germ layers;
(iii) exhibiting no neoplastic proliferation; and
(iv) having self-renewal ability.

According to one aspect of the present invention, the Muse cells to be used for the cell preparation and pharmaceutical composition of the present invention have all of these properties. As regards (i), "low or non-existent telomerase activity", this refers to low or non-detectable telomerase activity when using a TRAPEZE XL telomerase detection kit (Millipore), for example. "Low" telomerase activity is, for example, either telomerase activity on the same level as human fibroblasts, which are somatic cells, or telomerase activity of $1/5$ and preferably no greater than $1/10$ of that of Hela cells. In regard to (ii), the Muse cells have the ability to differentiate into the three germ layers (endoderm, mesoderm and ectoderm) in vitro and in vivo, and by induction culturing in vitro, for example, they can differentiate into hepatocytes, neurons, skeletal muscle cells, smooth muscle cells, osteocytes or adipocytes. They may also exhibit the ability to differentiate into the three germ layers in the case of transplanting in vivo into the testes. They also have the ability to migrate and engraft onto damaged organs (heart, skin, spine, liver, muscle, etc.), by transplantation administration into the body via intravenous injection, and differentiate into specific cells of the corresponding tissue. In regard to (iii), the Muse cells have the property of proliferating at a rate of about every 1.3 days in suspension culture, and growing in suspension culture from a single cell to form an embryoid-like cell mass, slow down the growth at about 14 days; however, when the embryoid-like cell mass is carried into adhesion culture, cell growth resumes and the proliferated cells spread out from the cell mass. They also have the property of not generating teratomas at least for 6 months after transplantation into the testes. In regard to (iv), Muse cells have self-renewal (auto-replicating) ability. The term "self-renewal" means that cells in the embryoid-like cell mass obtained by culturing a single Muse cell in suspension culture can be confirmed to differentiate into cells of all three germ layers, and also that when a single cell from the embryoid-like cell mass is again carried into a suspension culture, it forms a next generation embryoid-like cell mass, and reproduce differentiation into three germ layers as well as embryoid-like cell mass in the suspension culture can be confirmed. Self-renewal may be observed once or as several repeated cycles.

In addition, a cell fraction containing Muse cells to be used in the cell preparation of the present invention may be a cell fraction having the SSEA-3 positive and CD105-positive pluripotent stem cells concentrated, obtained by a method of applying external stress treatment to mesenchymal tissue of a body or cultured mesenchymal cells, causing the cells other than the external stress-resistant cells to die, and recovering the surviving cells, the cell fraction having at least one and preferably all of the following properties.
(i) SSEA-3 positivity;
(ii) CD105-positivity;
(iii) low or non-existent telomerase activity;
(iv) having the ability to differentiate into any of the three germ layers;
(v) exhibiting no neoplastic proliferation; and
(vi) having self-renewal ability.

The external stress may be any one or a combination of: protease treatment, culturing in a low oxygen concentration, culturing under low-phosphate conditions, culturing with low serum concentration, culturing under low nutritive conditions, culturing under exposure to heat shock, culturing at low temperature, freezing treatment, culturing in the presence of a hazardous substance, culturing in the presence of active oxygen, culturing under mechanical stimulation, culturing with agitating treatment, culturing with pressure treatment, or physical impact. For example, the treatment time with a protease is preferably a total of 0.5 to 36 hours to apply external stress to the cells. The protease concentration may be the concentration used when the cells adhering to a culture vessel are detached, when the cell mass is dispersed into individual cells, or when individual cells are recovered from tissue. The protease is preferably a serine protease, aspartic acid protease, cysteine protease, metalloprotease, glutamic acid protease or N-terminal threonine protease. The protease is also preferably trypsin, collagenase or dispase.

Muse cells having features allowing them to be used in a cell preparation of the present invention are administered to an organism either directly at the affected site or injected into an vein, and subsequently become engrafted onto damaged bladder tissue. It is thought that the Muse cells then differentiate into cells forming the tissue, thus ameliorating and/or treating interstitial cystitis. According to the present invention, the amelioration and treatment are not limited to bladder disorder associated with interstitial cystitis, but may also be applied for frequent urination, increased urinary motivation, urinary urgency, bladder pain, urethral pain, pelvic pain, perineal pain and/or coital pain.

(2) Preparation and Use of Cell Preparation and Pharmaceutical Composition

The cell preparation and pharmaceutical composition of the present invention may be obtained by suspending the Muse cells or a cell population containing Muse cells obtained by (1) above, in physiological saline or an appropriate buffer solution (for example, phosphate-buffered saline), although this is not limitative. In this case, when the number of Muse cells separated from autologous or heterologous tissue is low, the cells may be cultured before administration for growth until the prescribed cell concentration is obtained. As already reported (International Patent Publication No. WO2011/007900), Muse cells do not generate tumors, and therefore even if the cells recovered from biological tissue are in undifferentiated form, they have low malignancy and are safe. There are no particular restrictions on culturing of the recovered Muse cells, and it may be carried out in common growth medium (for example, α-Minimal Essential Medium (α-MEM) containing 10% newborn calf serum). More specifically, referring to International Patent Publication No. WO2011/007900, suitable medium and additives (for example, antibiotics and serum) may be selected for culturing and growth of the Muse cells, and a solution containing the prescribed concentration of Muse cells may be prepared. When a cell preparation or pharmaceutical composition of the present invention is to be administered to a human patient, several mL of bone marrow fluid may be harvested from human iliac bone, and for example, the bone marrow mesenchymal stem cells may be cultured as adherent cells from the bone marrow fluid to increase them to a number of cells allowing separation of an effective therapeutic amount of Muse cells, after which the Muse cells may be separated out with SSEA-3 antigen marker as the indicator, and autologous or heterologous Muse cells prepared as a cell preparation. As an alternative example, Muse cells that have been separated using SSEA-3 antigen marker as the indicator, and the cells cultured to increase them to an effective therapeutic amount, may then be prepared as a cell preparation of autologous or heterologous Muse cells.

For use of the Muse cells in a cell preparation or pharmaceutical composition, dimethyl sulfoxide (DMSO) or serum albumin may be added to the cell preparation or pharmaceutical composition to protect the cells, and an antibiotic or the like may be added to prevent infiltration and growth of bacteria. In addition, other pharmaceutically acceptable components (for example, carriers, excipients, disintegrators, buffering agents, emulsifying agents, suspending agents, soothing agents, stabilizers, preservatives, antiseptic agents, physiological saline and the like), or cells or components other than Muse cells that are present among mesenchymal stem cells, may be added to the cell preparation or pharmaceutical composition. A person skilled in the art may add such factors and chemical agents to the cell preparation and pharmaceutical composition in appropriate concentrations.

The number of Muse cells in the cell preparation and pharmaceutical composition to be prepared may be appropriately adjusted so as to obtain the desired effect for amelioration and/or treatment of disorder or symptoms associated with interstitial cystitis (for example, improvement in frequent urination or disappearance of bladder pain symptoms), in consideration of the target gender, age and body weight, the state of the affected area, and the state of the cells to be used. In the Examples described below, 0.2 N hydrochloric acid (0.3 mL) was injected into rat bladders for 15 minutes to create a Hunner-type interstitial cystitis (HIC) model, and the therapeutic effect of Muse cell transplantation was examined with the rat model as the treatment target. When rat models with body weight of approximately 15 to 20 g were administered SSEA-3 positive cells at $1\times10^5$ cells/rat by direct injection into the bladders, a very excellent effect was obtained. With intravenous administration of Muse cells, however, in order to avoid obstruction by administration of the cells into blood vessels, the SSEA-3 positive cells may be added to the cell preparation at $1\times10^8$ cells/individual or less, for example, as the amount per single administration. Here, "individual" includes, but is not limited to, a rat or human. The cell preparation and pharmaceutical composition of the present invention may be administered several times (for example, 2 to 10 times) at appropriate intervals (for example, twice a day, once a day, twice a week, once a week, once every 2 weeks, or once a month), until the desired therapeutic effect is obtained. Therefore, the therapeutically effective dose, while depending on the condition of the subject, is preferably a dose of $1\times10^4$ cells to $1\times10^9$ cells per individual, administered 1 to 10 times, for example. The total amount of administration per rat is not limited, and may be $1\times10^5$ cells to $1\times10^{10}$ cells, $1\times10^5$ cells to $1\times10^9$ cells, $1\times10^5$ cells to $5\times10^8$ cells, $1\times10^5$ cells to $1\times10^8$ cells, $1\times10^5$ cells to $5\times10^7$ cells, $1\times10^5$ cells to $1\times10^7$ cells, $5\times10^5$ cells to $1\times10^{10}$ cells, $5\times10^5$ cells to $1\times10^9$ cells, $5\times10^5$ cells to $5\times10^8$ cells, $5\times10^5$ cells to $1\times10^8$ cells, $5\times10^5$ cells to $5\times10^7$ cells, $5\times10^5$ cells to $1\times10^7$ cells, $1\times10^6$ cells to $1\times10^{10}$ cells, $1\times10^6$ cells to $1\times10^9$ cells, $1\times10^6$ cells to $5\times10^8$ cells, $1\times10^6$ cells to $1\times10^8$ cells or $1\times10^6$ cells to $5\times10^7$ cells.

The cell preparation and pharmaceutical composition of the present invention is intended for amelioration and treatment of disorder or symptoms associated with interstitial cystitis, but the period for administration is not particularly restricted so long as it is after onset of the disorder or symptoms (such as frequent urination or bladder pain). An effect may be expected by the cell preparation of the present invention even for long periods of several hours, one day, several days, one week, several weeks or one month after onset. Furthermore, since the Muse cells to be used have been confirmed in experiments by the present inventors to not elicit an immune response even when heterologously derived, they may be suitably administered until the desired effect for amelioration and treatment of disorders or symptoms associated with interstitial cystitis is obtained. In Examples 2 to 4 below, direct injection of Muse cells injected into the bladders of the HIC model produced notable reduction in rat urination frequency and urination volume, lower maximum bladder capacity and disappearance or reduction in bladder pain.

The Muse cells used in the cell preparation and pharmaceutical composition of the present invention have the property of engrafting onto the affected site, and previous experiments suggest that they also accumulate at the affected site when intravenously administered. According to one aspect of intravenous administration of Muse cells, there is no restriction on the site of administration (for example, intraperitoneal, subcutaneous, intracutaneous or intramuscular injection, or injection at the affected area), or the type of blood vessel for administration (vein or artery), for administration of the cell preparation or pharmaceutical composition. The method for confirming whether the administered Muse cells have reached and engrafted to the affected site may be, for example, creation of Muse cells previously subjected to gene transfer so as to express a fluorescent protein (for example, green fluorescent protein (GFP)), and after administration to the body, observation may be carried out using a system that can detect fluorescence (for example, an IVIS® Imaging System (product of Pharma International, Inc.)), to confirm the dynamics of the Muse cells. Since the Muse cells to be used in the cell preparation and pharmaceutical composition of the present invention are human-derived, they are xenogenous with respect to rats. In an experiment in which xenogenous cells are administered to an animal model, an immunosuppressive agent (such as cyclosporin) may be administered either before or simultaneously with administration of the xenogenous cells to suppress in vivo rejection of the xenogenous cells.

3. Preparation of Hunner-Type Interstitial Cystitis (HIC) Model

For the purpose of the present specification, a rat model with onset of Hunner-type interstitial cystitis may be created and used to examine the ameliorating and treatment effect of the cell preparation and pharmaceutical composition of the present invention on disorder or symptoms associated with interstitial cystitis (for example, frequent urination or bladder pain). The rat model may be used by the method commonly employed by those skilled in the art, and can be easily created by, for example, injecting 0.2 N hydrochloric acid (0.3 mL) into rat bladders for 15 minutes. The rats used for the HIC model may usually be Wistar/ST rats or Sprague-Dawley (SD) rats.

4. Amelioration and Treatment Effect by Muse Cells in HIC Rat Model

The cell preparation and pharmaceutical composition of the present invention can ameliorate and/or treat disorders or symptoms associated with interstitial cystitis in mammals including humans. A common method may be used to examine improvement in symptoms after application of Muse cells in an HIC rat model created as described above according to the present invention, in order to evaluate the effect of the Muse cells. As demonstrated by the Examples described below, the therapeutic effect of applying Muse cells can be evaluated by examining changes in urination frequency and urination volume, or bladder pressure (bladder basal pressure, urination threshold pressure, maximum bladder contraction pressure, maximum bladder capacity and post-void residual), and infiltration of inflammatory cells or disappearance or reduction of bladder pain, in the rat model.

(1) Measurement of Urination Frequency and Urination Volume

Measuring changes in urination frequency and urination volume allows the bladder state in the rat model to be observed in a periodic manner. Tracking changes in urination frequency and urination volume is generally carried out using a rat metabolic cage (for example, an SN-781 by Shinano Seisakusho). A metabolic cage is provided with a water bottle and a feeder, and a feces/urine separation funnel for collection and separation of feces and urine. A metabolic cage can be used to measure the urination frequency and urination volume per day.

(2) Measurement of Bladder Pressure

Figure 15:
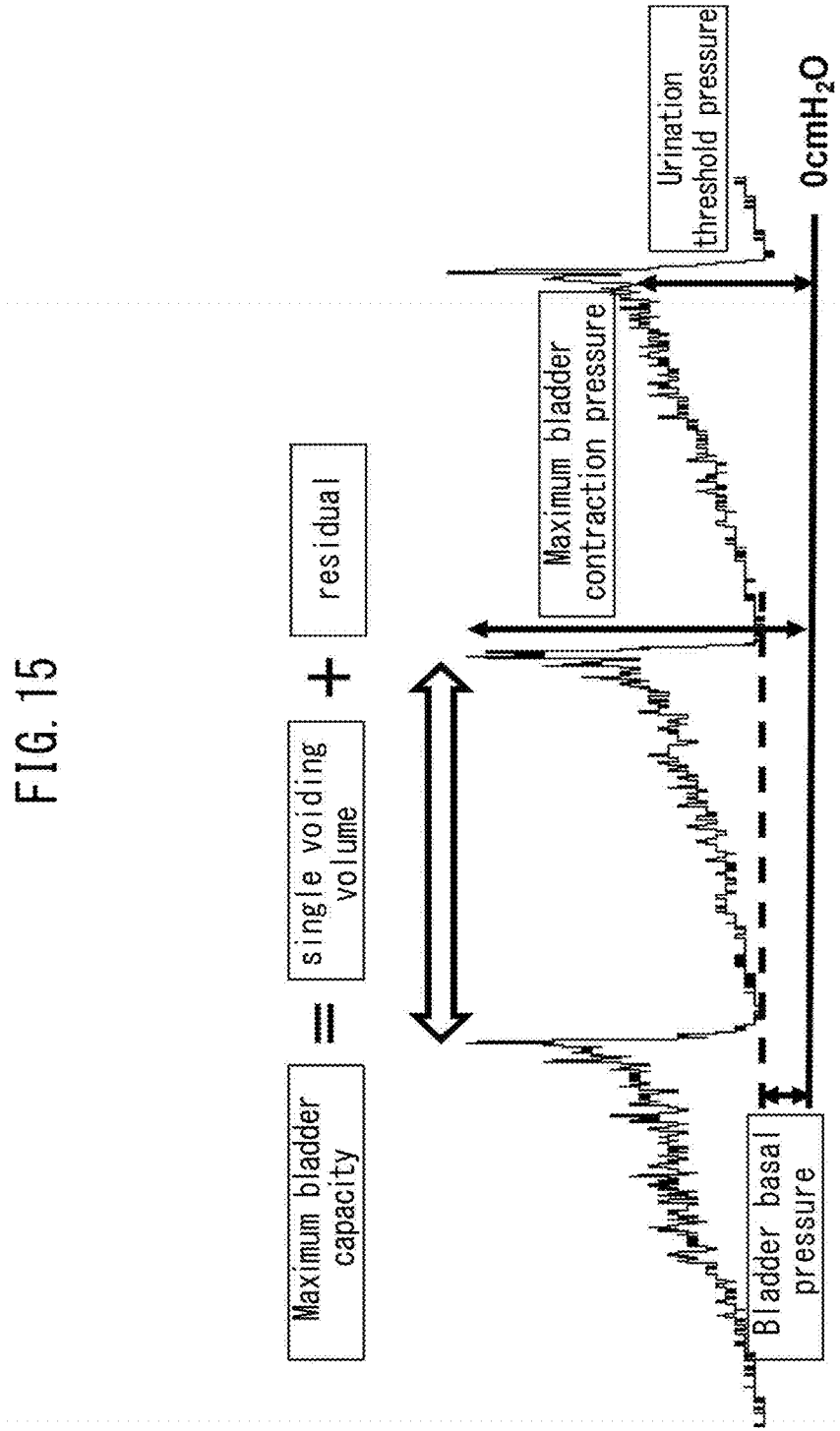
FIG. 15 is a graph showing the relationship between bladder basal pressure, urination threshold pressure, maximum bladder contraction pressure and maximum bladder capacity in bladder pressure measurement.

Bladder pressure in the rat model can be measured using the Cystometrogram (CMG) method. The CMG method has been fully established as a cystometrographic method for measurement of internal pressure by intravesical injection of physiological saline. With this method it is possible to measure "bladder basal pressure", "urination threshold pressure", "maximum bladder contraction pressure", "maximum bladder capacity" and "post-void residual", and as an example, FIG. 15 shows the relationship between these parameters in measurement of periodic bladder pressure.

(3) Measurement of Inflammatory Cell Infiltration

Cystitis is a condition with inflammation in the bladder, and inflammation generally involves accumulation and infiltration of inflammatory cells at the affected site. Treatment or improvement of cystitis can be evaluated by histological observation of the presence or absence of infiltrating inflammatory cells, or by measuring expression of inflammatory markers (such as TNFα and IL-1α).

(4) Bladder Pain Observation

Bladder pain is one symptom seen in patients with onset of interstitial cystitis. Bladder pain is generally determined by a method of measuring the frequency of pain behaviors (such as freezing or licking). Freezing behavior is thought to reflect bladder pain through the pelvic nerve, while licking behavior is thought to reflect urethral pain through vulval nerves. For bladder pain transmitted through the pelvic nerve, the appearance of c-Fos positive cells in the lumbar nerve (L6) can be used as an indicator.

The present invention will now be explained in more specific detail through the following examples, with the understanding that the present invention is in no way limited by the examples.

EXAMPLES

Overview of the Experiment

The protocol for the experimental animals used in this research was that approved by the Committee for Animal Experiments of the Jikei University School of Medicine. The bladders of F344 female rats (Sankyo Labo) were injected with 0.3 mL of 0.2 N hydrochloric acid for 15 minutes under isoflurane anesthesia to create a model of Hunner-type interstitial cystitis (HIC). After 6 hours, the front and rear bladder walls were injected with 10 μL each of Muse cells ($2\times10^4/20$ μL) separated from commercially available human bone marrow cells, human bone marrow non-Muse cells ($2\times10^4/20$ μL) containing no Muse cells, and Hank's balanced salt solution (HBSS) (vehicle). The control group was injected in the bladder with 0.3 mL of physiological saline, after which the bladder walls were injected with HBSS. A metabolic cage was used to examine changes in urination frequency per day before and after cell therapy. After one week, cystometrography was carried out while awake and the bladder tissue was extracted (HE•TNFα staining and IL-1α ELISA). TNFα staining and IL-1α are inflammation markers. Different rats were used for a pain experiment (freezing frequency) after bladder injection of 1 mM capsaicin, and the L6 spinal cord was excised (c-Fos staining). Freezing indicates bladder pain, and the number of freezing actions during 5 minutes was measured, where halted breathing for 1 second or longer during a period of 5 seconds was counted as one freezing action. c-Fos is a marker indicating nerve pain reaction. The engraftment rates of Muse cells and non-Muse cells labeled with mCherry were examined after 1 week.

Example 1: Measurement of Change in Urination Frequency and Urination Volume Per Day After bladder injection of Muse cells in the created HIC rat model, the change in urination frequency and urination volume per day were examined. The results are shown in FIG. 1. In the vehicle group and the non-Muse group, a significant increase in urination frequency per day was observed compared to the control group. Similarly, a significant decrease in urination volume per day was observed in the vehicle group compared to the control group. In the Muse group, however, no significant difference in urination frequency change or urination volume per day was observed compared to the control group.

Figure 2:
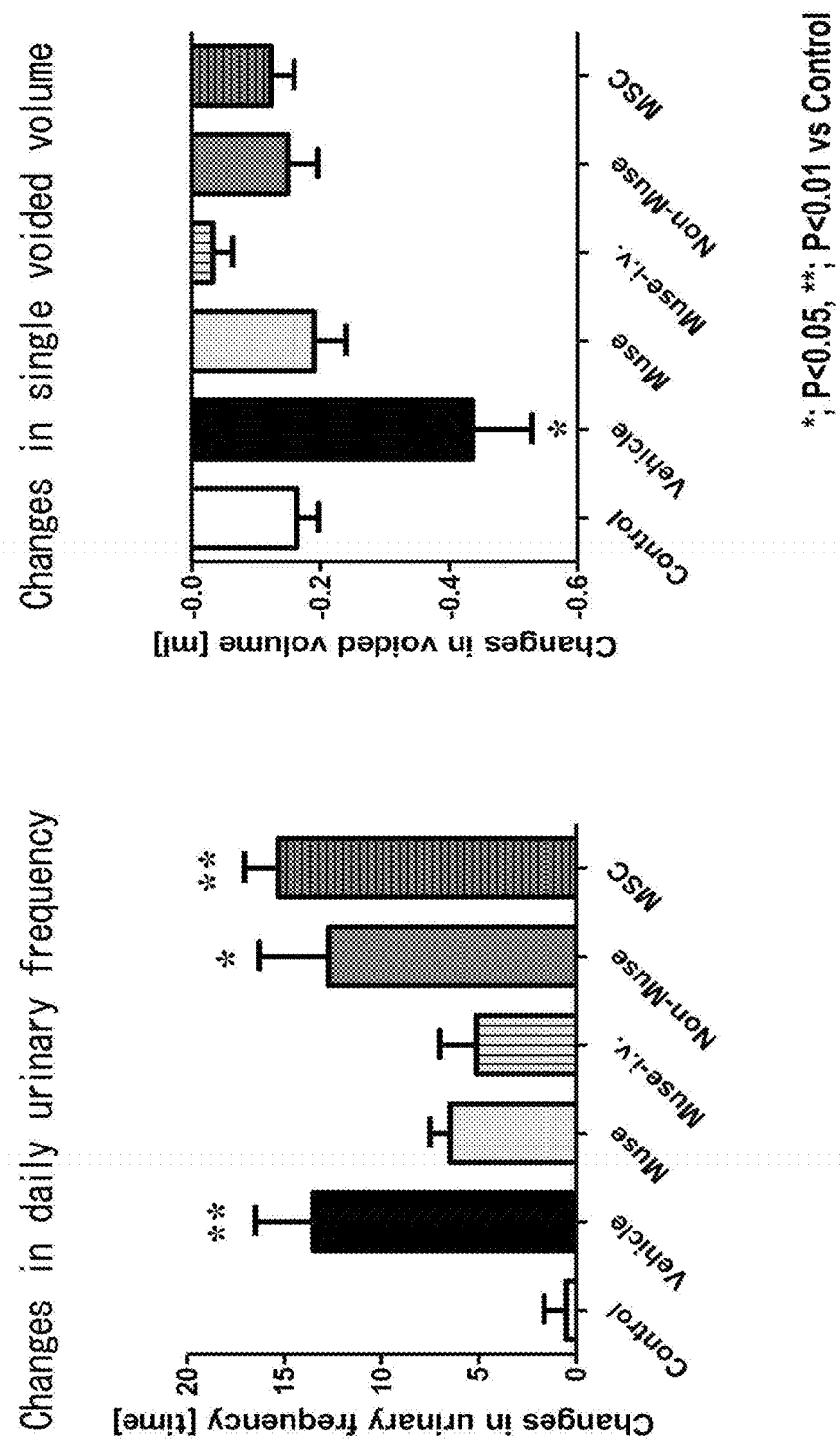
FIG. 2 shows the results of measuring change in urination frequency and urination volume per day in an HIC rat model.

Additional testing was conducted for change in urination frequency and urination volume, to include administration of Muse cells ($2\times10^4/50$ μl) into the caudal vein of the HIC rat model, and administration of 10 μl each of mesenchymal cells (MSC) ($2\times10^4$ each) into the front and rear bladder walls of the rat model. The results are shown in FIG. 2. In the MSC group, similar to the vehicle group and the non-Muse group, a significant increase in urination frequency per day was observed compared to the control group. However, the Muse cell group comprising rats that were administered through the caudal vein (Muse-i.v.) showed no significant difference compared to the control group, while a tendency toward reduced urination frequency was seen, at about the same degree as the bladder-injected Muse cell group. In the measurement results for daily urination volume, a decrease in urination volume was observed in the Muse cell group that was administered through the caudal vein, compared to the vehicle group.

Example 2: Measurement of Bladder Pressure

Figure 3:
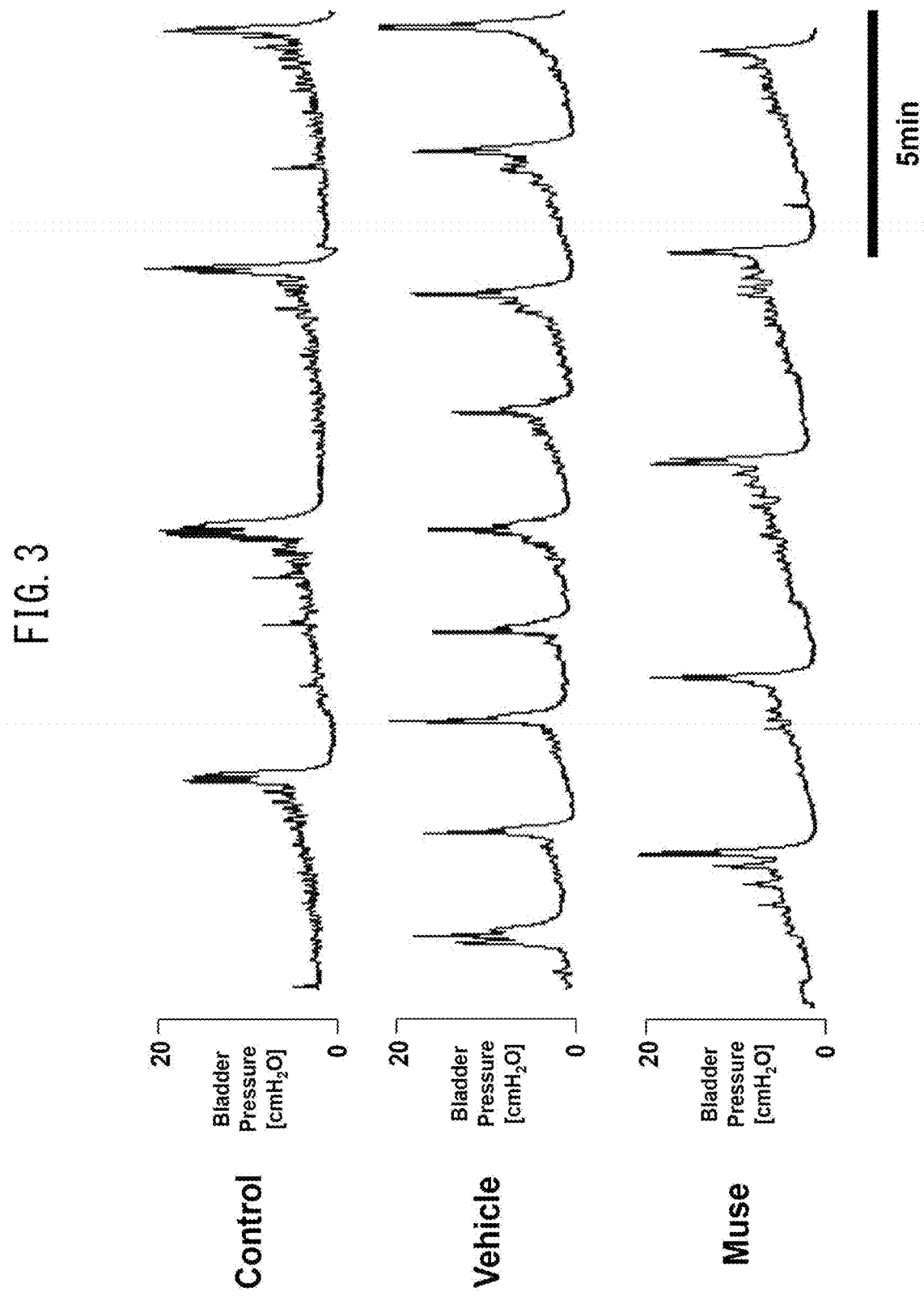
FIG. 3 shows a typical example of bladder pressure measured during a given period in an HIC rat model.
Figure 4:
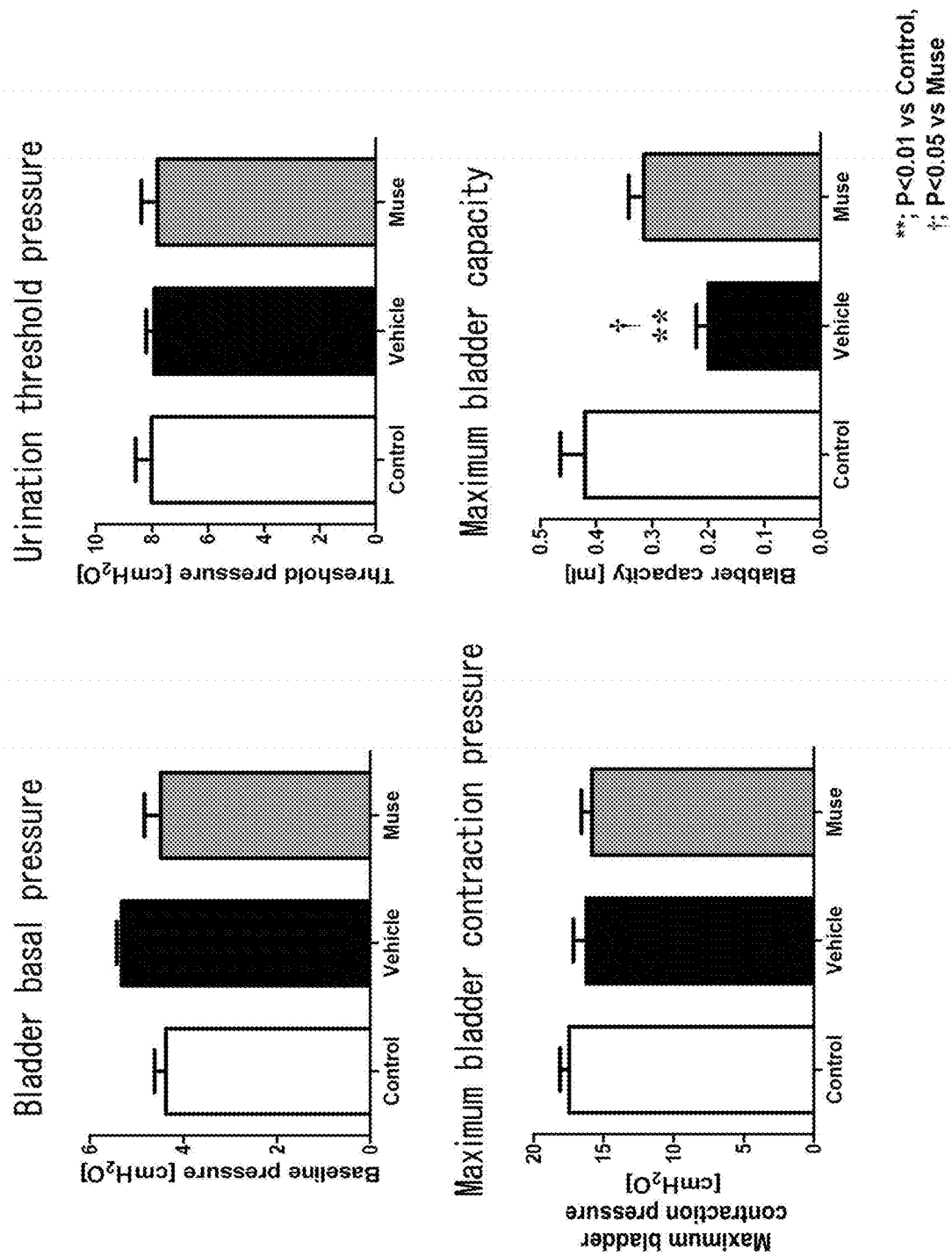
FIG. 4 shows the results for bladder basal pressure, urination threshold pressure, maximum bladder contraction pressure and maximum bladder capacity.

The bladder pressure was measured for the HIC rat model used in Example 1. The results are shown in FIG. 3 and FIG. 4. FIG. 3 shows a typical example of measuring bladder pressure through a given period of the experiment. The upper row of FIG. 3 shows periodic change in bladder pressure in the control, which indicates that the urinary interval was shorter and urination was more frequent in the vehicle group of the HIC rat model compared to the control. In the Muse cell-injected HIC rat model, urination was at the same frequency as the control.

FIG. 4 shows the results for bladder basal pressure, urination threshold pressure, maximum bladder contraction pressure and maximum bladder capacity in each group. In the vehicle group, the maximum bladder capacity was found to be significantly reduced compared to the control group and the Muse group. The other parameters were not significantly different between the three groups.

Table 3 summarizes the results for digitized data from the results of FIG. 3 and measurement of the bladder pressure after bladder injection of non-Muse cells. The post-void residual was measured for each group, with the results shown in Table 3.

TABLE 3

| Bladder pressure measurement | | | | | |
|---|---|---|---|---|---|
| | Mean (SD) BP, cmH$_2$O | Mean (SD) TP, cmH$_2$O | Mean (SD) MVP, cmH$_2$O | Mean (SD) BC, ml | Mean (SD) PVR, ml |
| Control | 4.35 (0.70) | 8.03 (1.58) | 17.45 (1.94) | 0.42 (0.13) | 0.02 (0.01) |
| HBS | 4.83 (0.29) | 7.93 (0.80) | 16.20 (2.65) | 0.20 (0.06)** | 0.02 (0.01) |
| Muse | 4.49 (0.98) | 7.81 (1.63) | 15.80 (2.17) | 0.32 (0.08) | 0.02 (0.01) |
| Non-Muse | 5.10 (0.54) | 8.55 (0.55) | 15.98 (1.02) | 0.21 (0.05)** | 0.02 (0.01) |

BP: Bladder basal pressure,
TP: threshold pressure,
MVP: maximum voiding pressure,
BC: bladder capacity,
PVR: post-void residual,
**<0.01 vs. control In the non-Muse cell group, the measurement results obtained for all of the parameters were on about the same level as the vehicle group. The post-void residual (PVR) was approximately the same numerical value in each of the administered groups.

Figure 5:
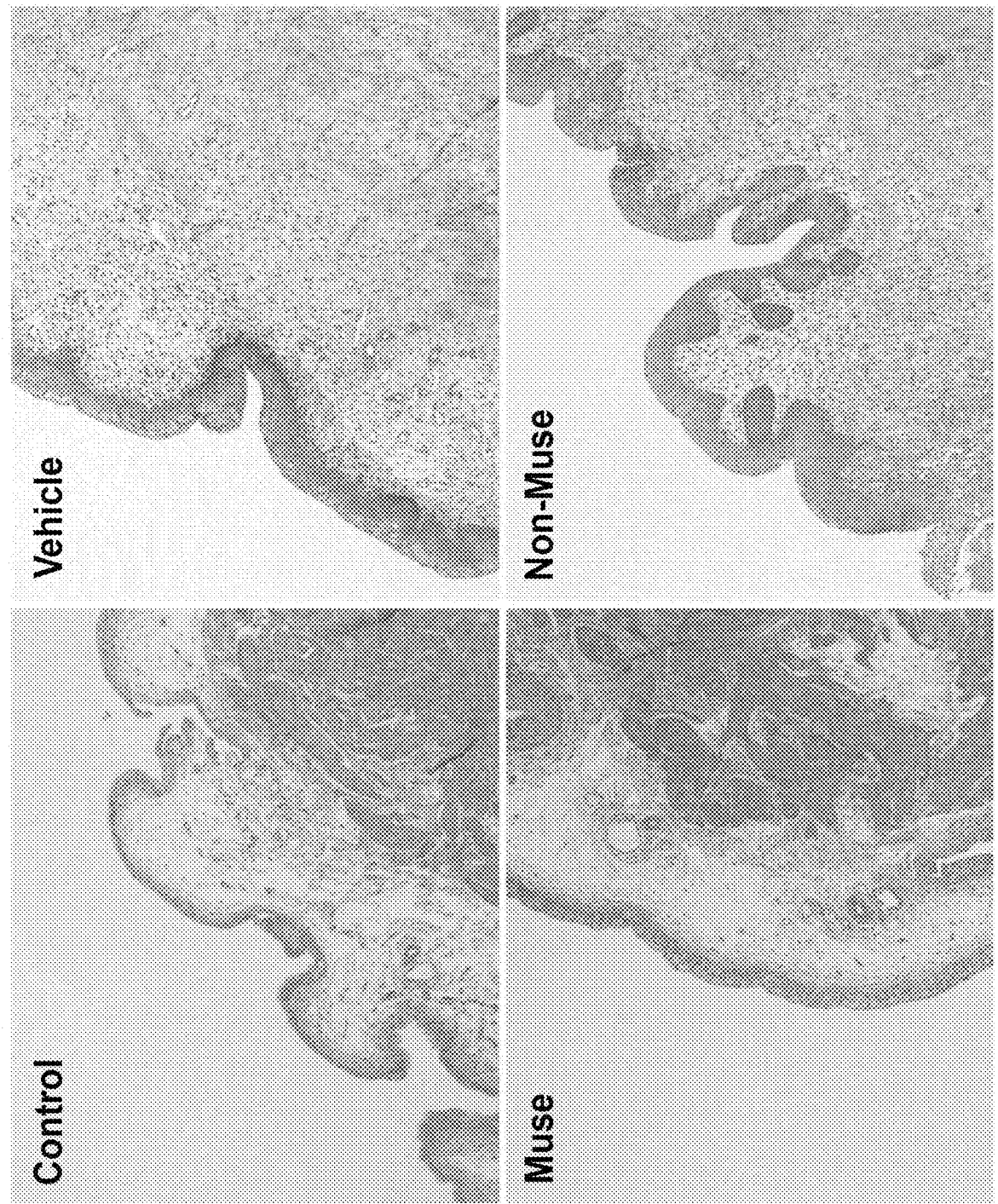
FIG. 5 shows diseased tissue in a hematoxylin-eosin (HE) stained bladder.

Example 3: Bladder Tissue Staining and Inflammation Marker Expression (1) Hematoxylin-Eosin (HE) Staining On the 7th day after the Muse cell or other injection, the bladder diseased tissue was stained with HE (hematoxylin-eosin) by a common method. As shown in FIG. 5, hyperplasia of the bladder epithelium and infiltration of inflammatory cells in the subepithelium and lamina propria was observed in the vehicle group and non-Muse group, compared to the control group. In the Muse group, however, no clear hyperplasia of the bladder epithelium or infiltration of inflammatory cells in the subepithelium or lamina propria was observed compared to the control group.

(2) Inflammation Marker Expression

Since infiltration of inflammatory cells was seen in the bladder tissue in the vehicle group and non-Muse cell group while no infiltration of inflammatory cells was seen in the Muse group, expression of the inflammation markers TNFα and IL-1α was examined.

Figure 6:
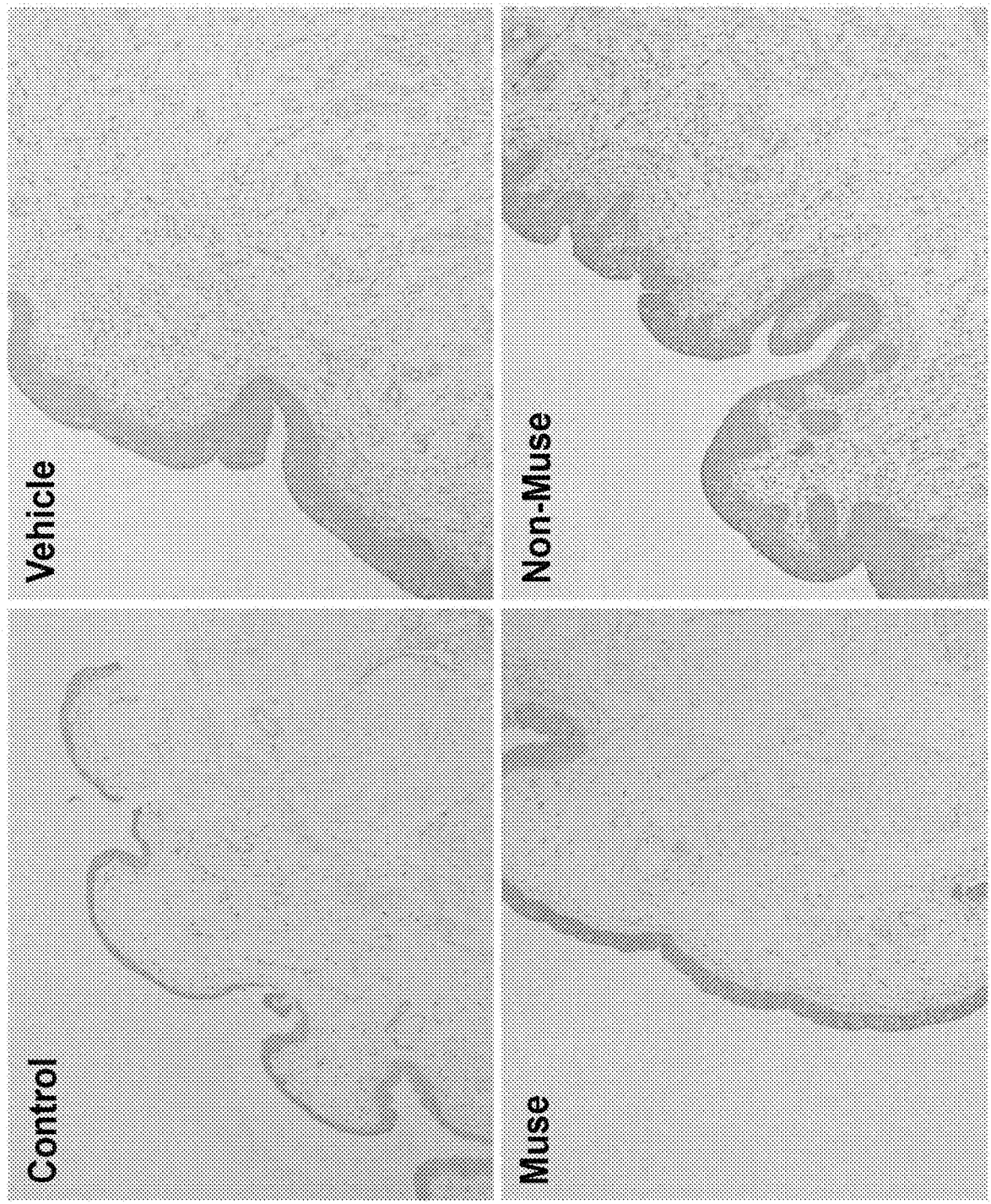
FIG. 6 shows bladder tissue immunostained with anti-TNFα antibody.
Figure 7:
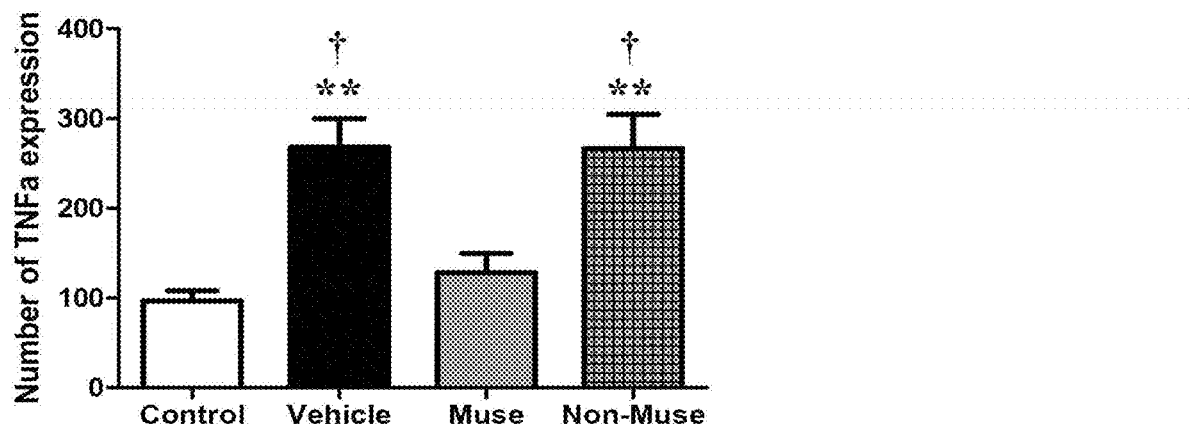
FIG. 7 shows the results of quantifying the TNFα-positive cell count in bladder using Image J software.
Figure 8:
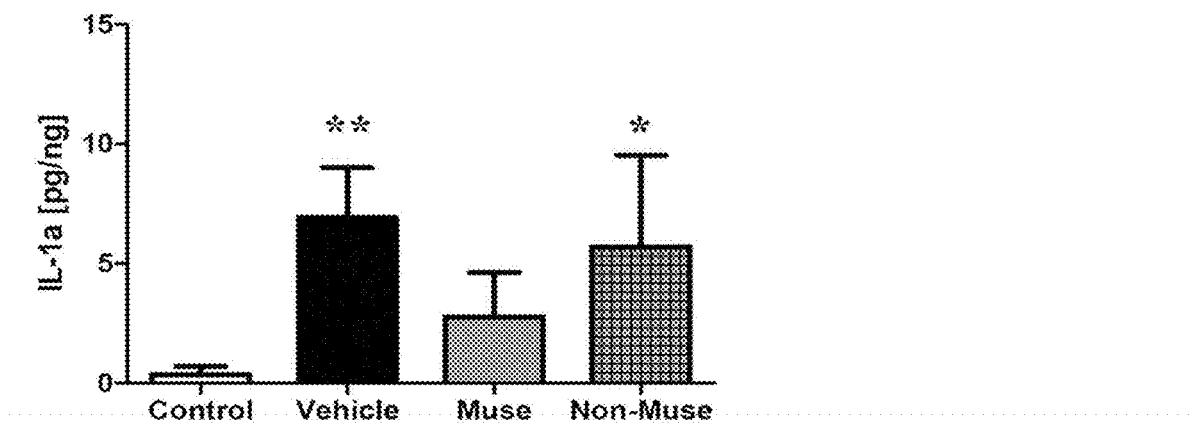
FIG. 8 shows the results of quantifying the IL-1α concentration of bladder tissue by ELISA.

Using a common method, the excised bladder tissue was immunostained with anti-TNFα antibody (Abcam) (FIG. 6) and the number of TNFα-positive cells appearing in the bladder (FIG. 7) was quantified using Image J software. The concentration of IL-1α (Merck, Ltd.) in the bladder tissue was also quantified by ELISA (FIG. 8). Based on TNFα staining, a significant increase in TNFα expression was found in the subepithelium and lamina propria in the vehicle group and non-Muse group compared to the control group and Muse group. For IL-1α, a significant increase in IL-1α expression in the bladder tissue was found in the vehicle group and non-Muse group compared to the control group. No significant difference in TNFα or IL-1α expression was found in the Muse group compared to the control group.

Example 4: Measurement of Bladder Pain

Figure 9:
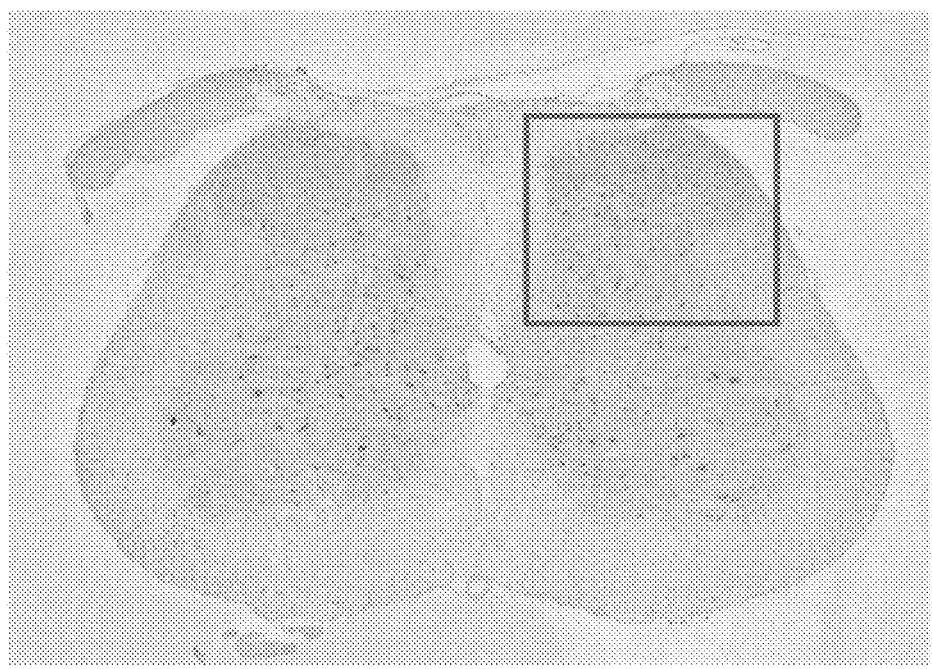
FIG. 9 shows bladder tissue immunostained with anti-c-Fos antibody.
Figure 10:
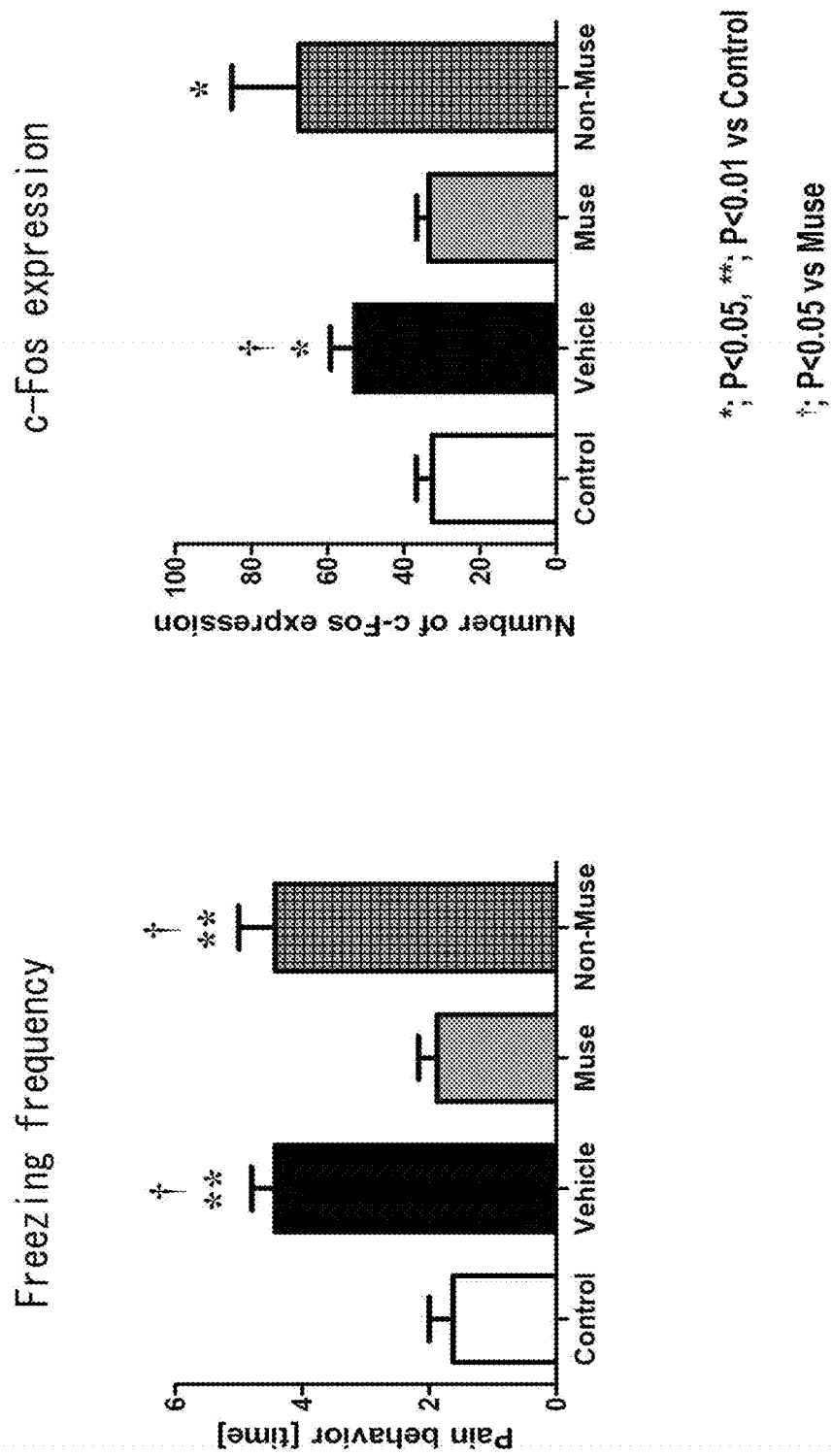
FIG. 10 shows the result of measuring frequency of freezing (left) and count of cells expressing c-Fos in bladder tissue (right) in different rat model groups.

For bladder pain in the HIC rat model, c-Fos expression in the L6 spinal cord posterior horn and frequency of freezing were measured to examine the effect of Muse cells on eliminating bladder pain. A spinal cord tissue sample was prepared from the HIC rat model, and c-Fos (Abcam) expression was examined by staining according to a common method (FIG. 9). The results of measuring the c-Fos positive cell count for each group in the same manner as Example 3 are shown at right in FIG. 10. In the vehicle group and the non-Muse group, a significant increase in c-Fos expression was observed compared to the control group. In addition, measurement of the freezing (bladder pain) frequency showed a significant increase in the frequency of freezing in the vehicle group and non-Muse group compared to the control group and Muse group (FIG. 10).

Example 5: Engraftment of Muse Cells to Bladder Tissue

Figure 11:
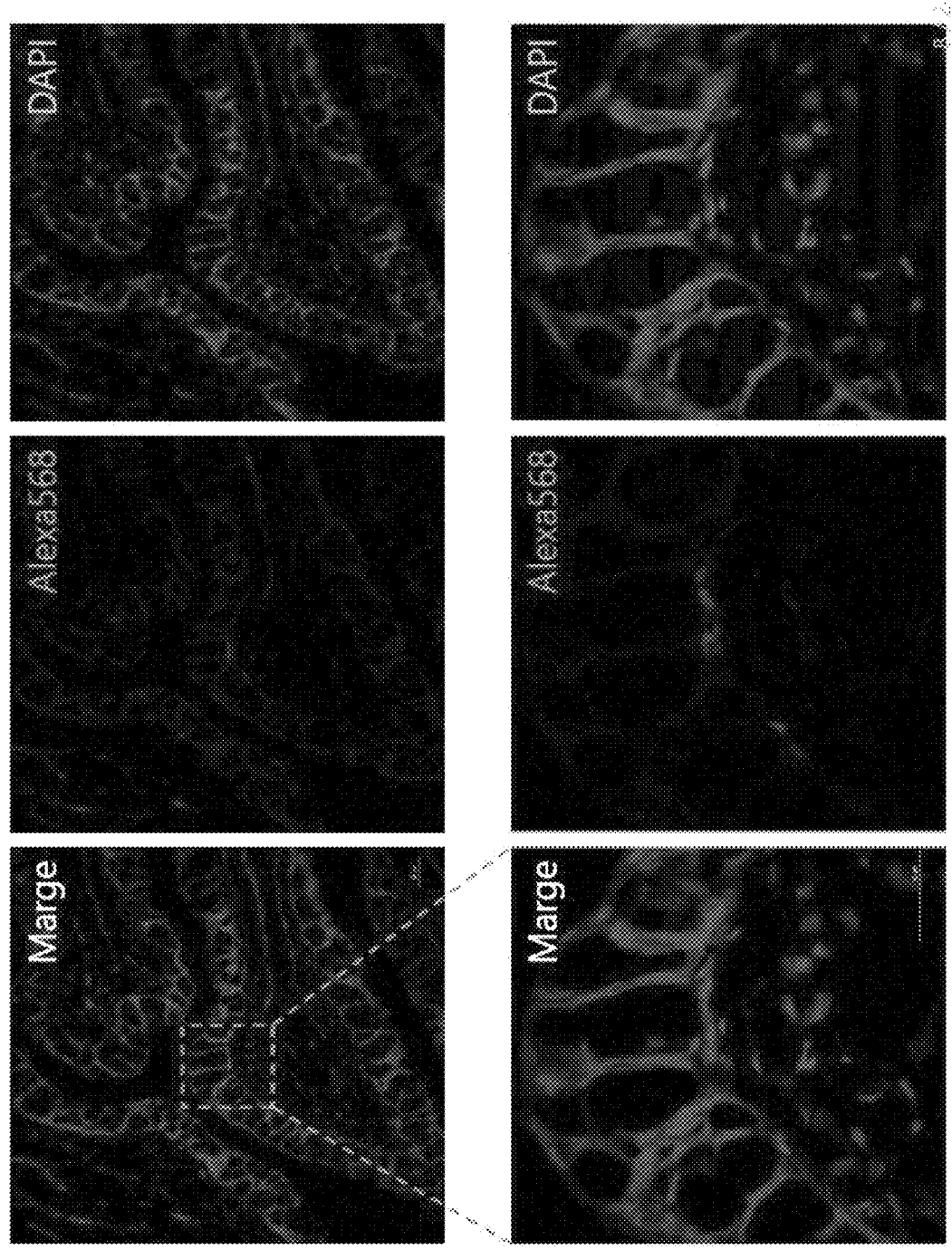
FIG. 11 is a set of images showing bladder tissue (bladder epithelial) transplanting of Muse cells injected into an affected site of a bladder.
Figure 12:
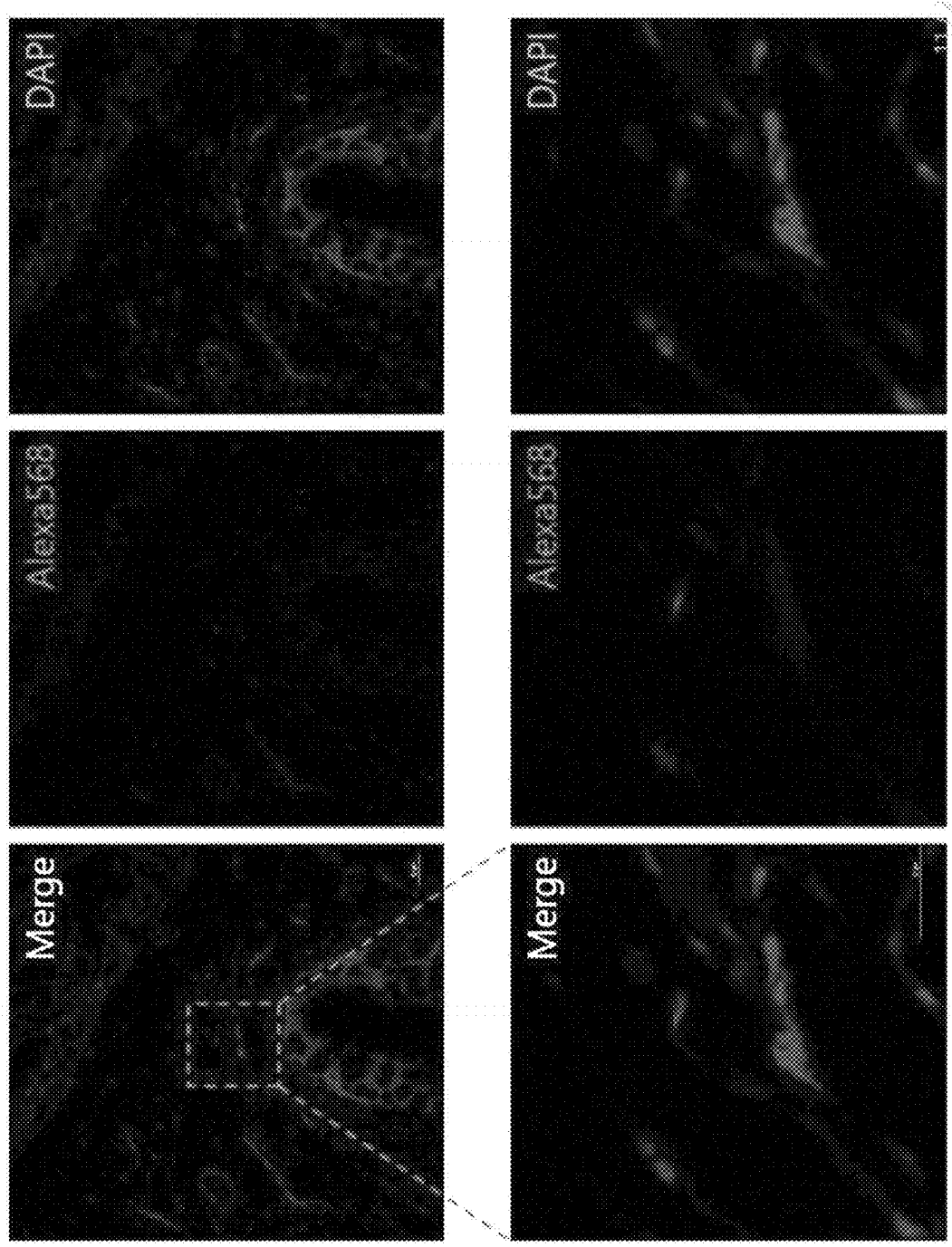
FIG. 12 is a set of images showing bladder tissue (lamina propria) transplanting of Muse cells injected into an affected site of a bladder.
Figure 13:
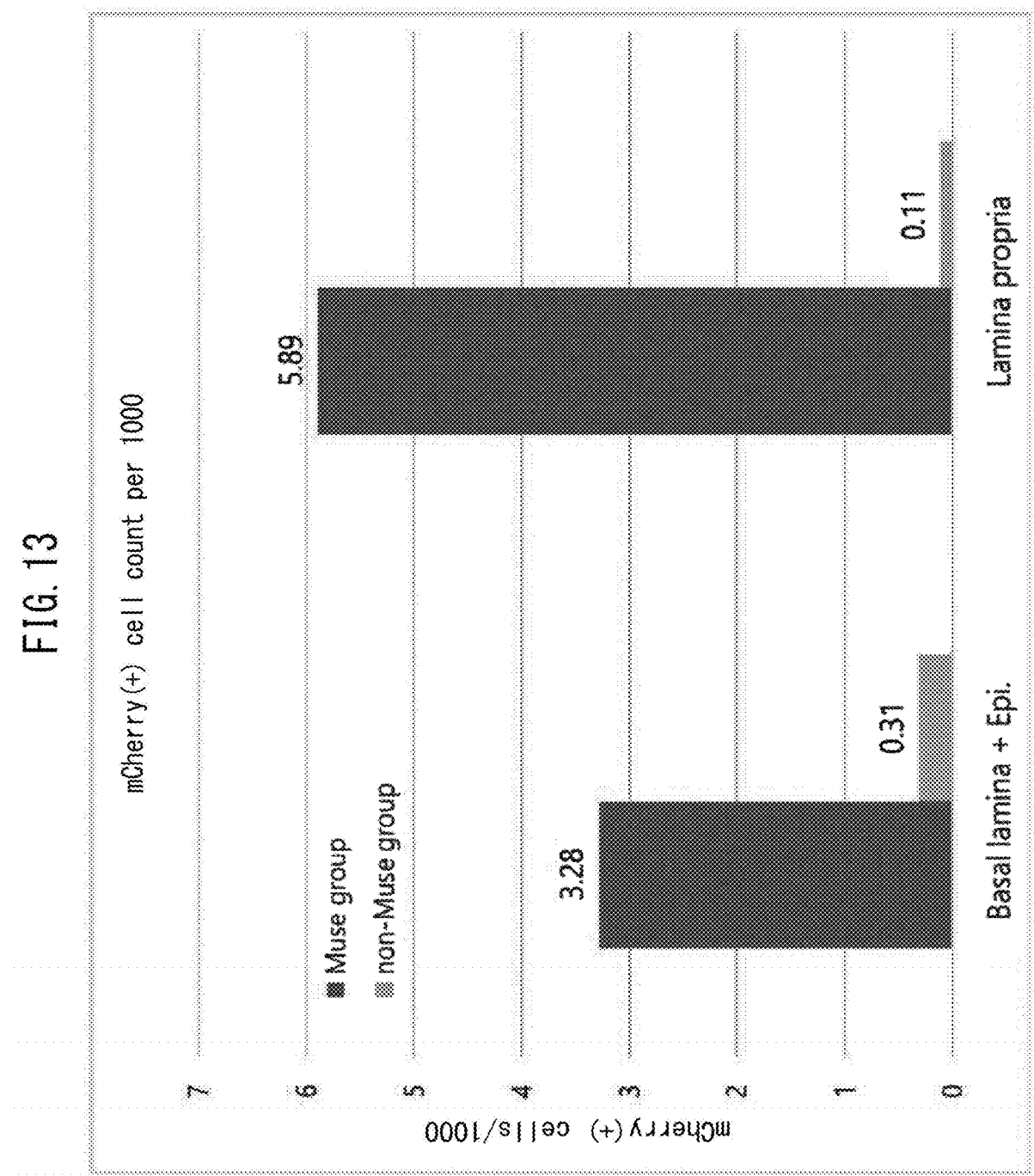
FIG. 13 shows the results of comparing number of engrafts of Muse cells and non-Muse cells in bladder tissue.

Lentivirus was used to transfer EF1α/promoter-mCherry gene into mesenchymal stem cells. This was followed by FACS to distinguish the mCherry-positive/SSEA-3 positive cell population (Muse cells) from the mCherry-positive/SSEA-3 negative cell population (non-Muse cells). The cells were administered to the rat model, the harvested bladders were stained with Alexa-labeled anti-mCherry antibody for mCherry protein, and the presence or absence and distribution of administered cells were analyzed. As a result, the Muse cells had a higher engraftment rate than the non-Muse cells, with engraftment mainly in the lamina propria (FIG. 11) and the bladder epithelial basal lamina (FIG. 12). FIG. 13 shows the results of comparing the number of engrafts of Muse cells and non-Muse cells in the bladder tissue, as the number of mCherry(+) cells per 1000 cells, based on the results shown in FIGS. 11 and 12. The muse cells had notable engraftment in the bladder epithelial basal lamina and lamina propria compared to the non-Muse cells.

Figure 14:
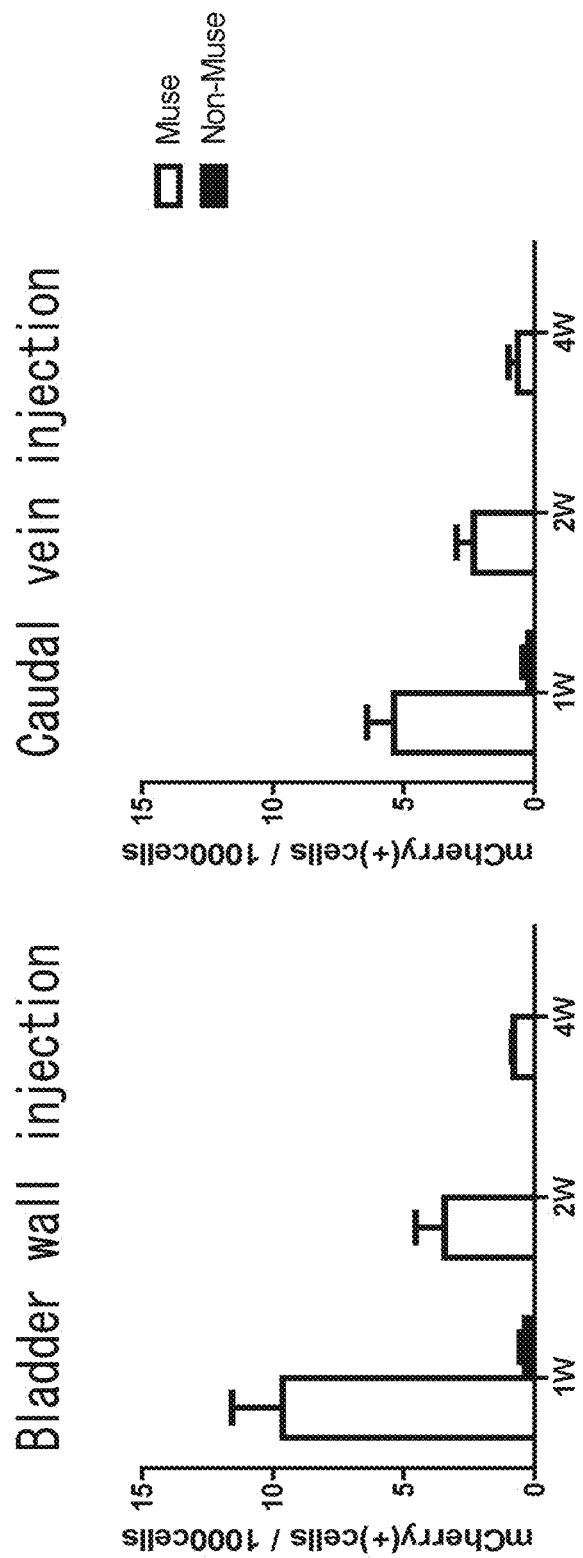
FIG. 14 shows the results of comparing number of engrafts of Muse cells and non-Muse cells in bladder tissue.

FIG. 13 shows the number of cells engrafted one week after administration of the Muse cells and non-Muse cells, and FIG. 14 shows the results of measuring the number of engrafts after 2 weeks and 3 weeks. The cell counts were totals for the number of engrafts in both the bladder epithelial basal lamina and lamina propria, and the results in FIG. 13 correspond to "1w" at left in FIG. 14. When Muse cells were injected into the bladder, they were found to remain in the bladder tissue even after 4 weeks.

The numbers of cells engrafted onto bladder tissue intravenously administered with Muse cells and non-Muse cells are shown at right in FIG. 14. Surprisingly, the number of cells engrafted onto the bladder tissue was high even with remote administration of Muse cells, even though the number of intravenously injected Muse cells was reduced compared to bladder injection. The protocol for intravenous administration and the experimental results for each of the evaluated parameters are shown in detail in Example 6.

Conclusion

The vehicle group and non-Muse group had significantly increased daily urination frequency, reduced vesical capacity, increased TNFα and IL-1α expression in bladder tissue, increased frequency of freezing (bladder pain) and increased c-Fos expression in the L6 spinal cord posterior horn, compared to the control group. On the other hand, the Muse group had no significant difference in change in daily urination frequency, vesical capacity, TNFα or IL-1α expression, freezing frequency or c-Fos expression, compared to the control group. The Muse cells also had a higher engraftment rate than the non-Muse cells, with engraftment mainly in the lamina propria and the bladder epithelial basal lamina. These results suggested the potential usefulness of Muse cell transplantation for HIC patients found to have high inflammation.

Example 6: Therapeutic Effect of Muse Cells for Interstitial Cystitis and Bladder Pain Syndrome, by Caudal Vein Injection Examples 1 to 5 examined the effect on interstitial cystitis and bladder pain syndrome with bladder injection of Muse cells, but for this Example the effect was examined with caudal vein injection.

(1) Preparation of Hunner-Type Interstitial Cystitis (HIC) Model

The above experiment overview described a method for preparing the HIC model, but the following is a slightly modified method, described in brief.

F344 female rats (12- to 13-week-old, Japan SLC, Inc.) were deprived of water for 5 to 8 hours, and then the intravesical residual urine was removed from the rats by aspiration through the urethra under isoflurane anesthesia. They were then injected with 0.2 N hydrochloric acid (0.2 mL/rat), and the HCl was removed after 4 minutes to prepare an HIC model. The day of HCl treatment was defined as day 0.

The group structure was as follows.
1) "Sham" group: physiological saline injected into rat bladder, Hank's balanced salt solution (HBSS) injected into caudal vein 18 hours after removal (n=18);
2) "Control" group: HCl injected into bladder, HBSS injected into caudal vein 18 hours after removal (n=18);
3) "Muse" group: HCl injected into bladder, Muse cells ($3 \times 10^6$/kg) injected into caudal vein 18 hours after removal (n=18).

(2) Measurement of Change in Urination Frequency and Urination Volume

Figure 16:
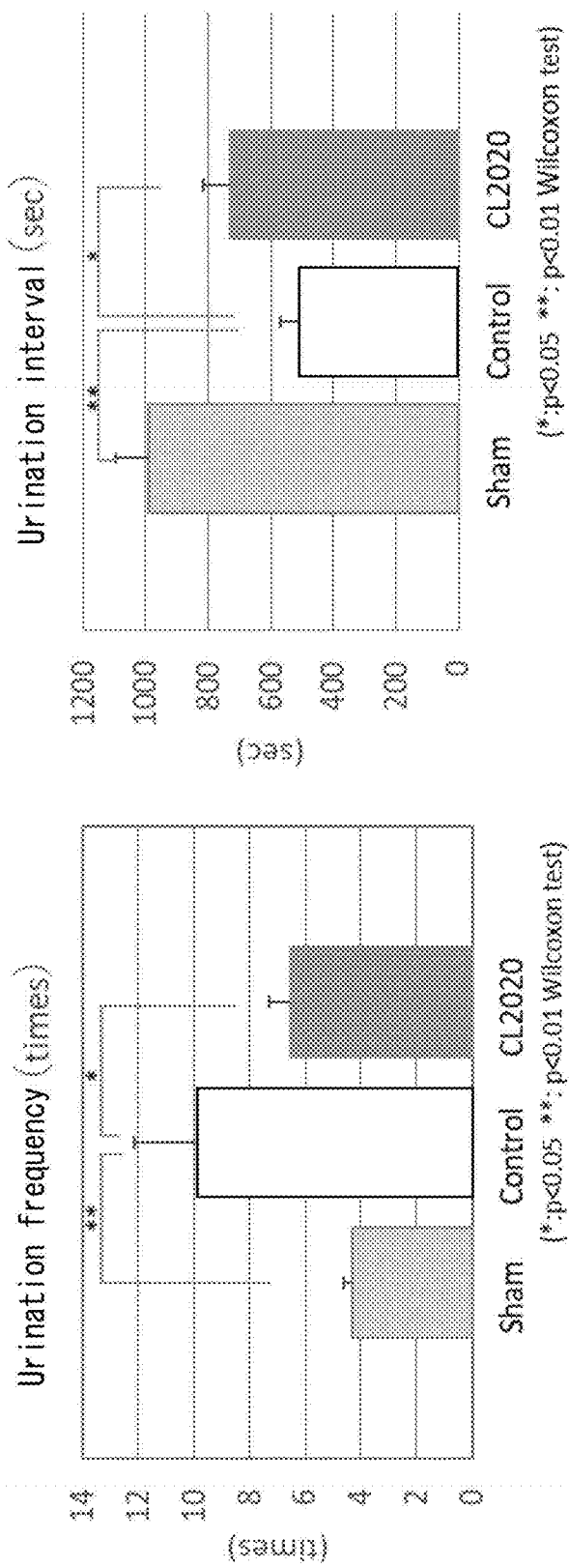
FIG. 16 shows urination frequency and average urination interval during an observation period (60 minutes) in a HIC rat model.

Urinary function was evaluated 6 days after each administration. FIG. 16 shows results for urination frequency and average urination interval during an observation period (60 minutes). In the Control group, urination frequency was increased and urinary interval was shortened, while significant improvement was seen for both in the Muse group.

(3) Measurement of Bladder Pain

Figure 17:
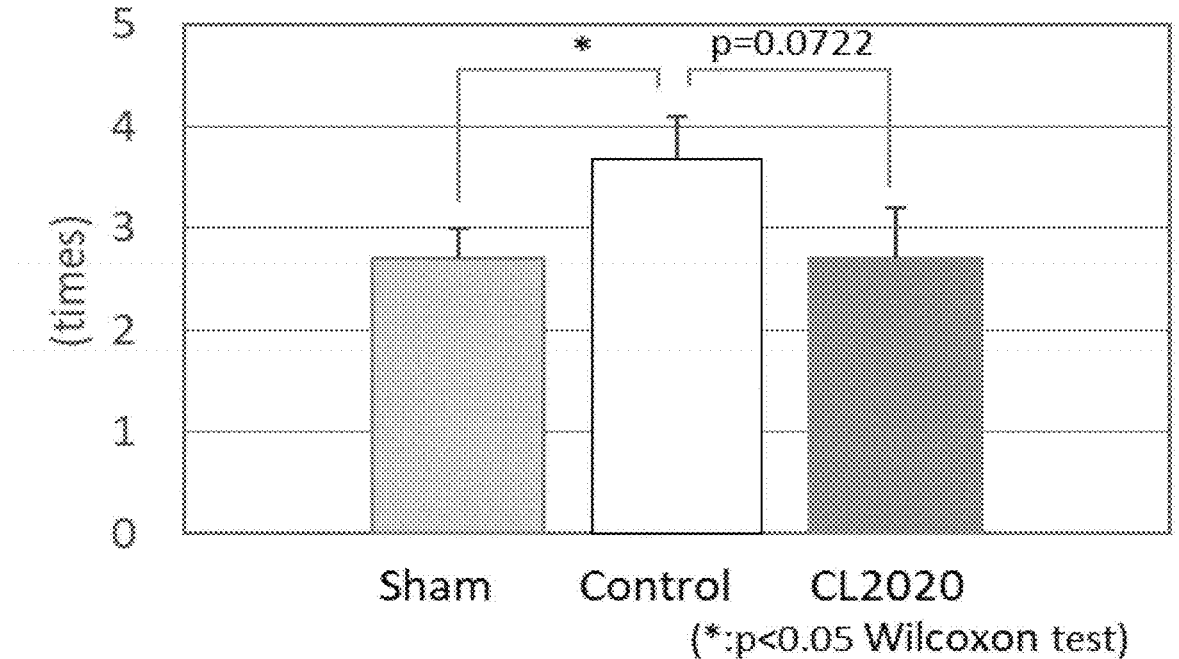
FIG. 17 shows number of respiratory arrests of 1 second or greater during an observation period (10 minutes) in an HIC rat model.
Figure 18:
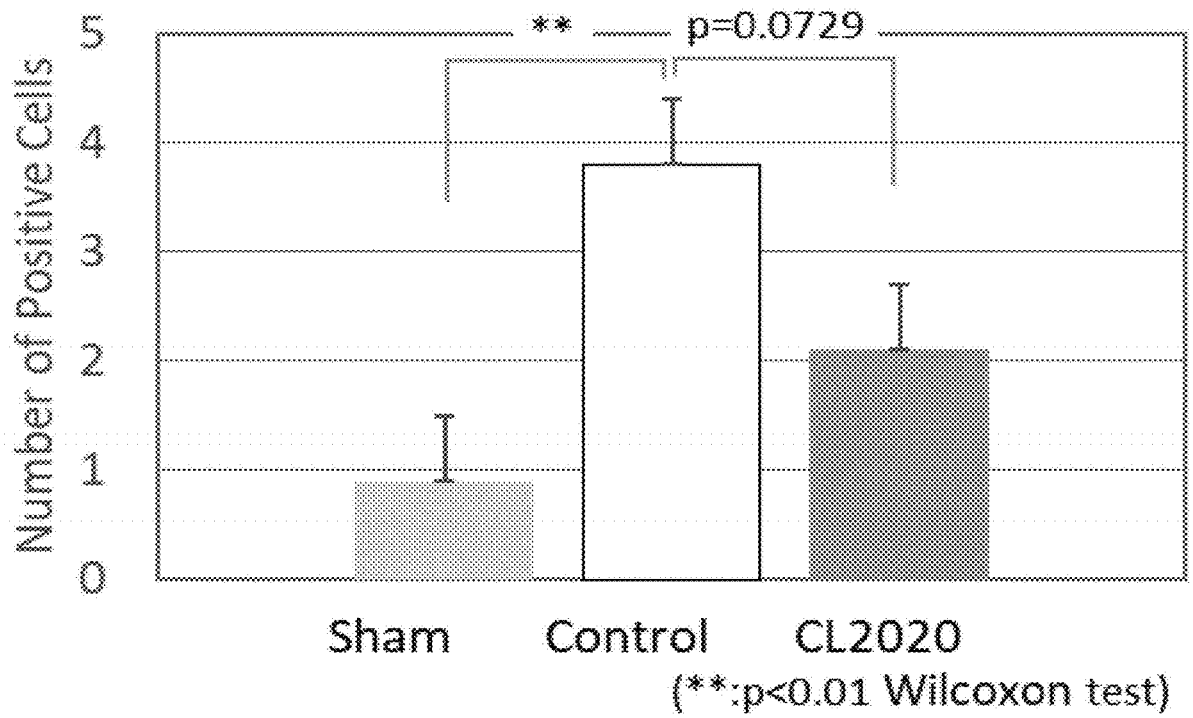
FIG. 18 shows c-fos immunostained positive cell counts for spinal (L6) at 7th days after administration.

On the 7th day after administration, the bladders were injected with 1 mM capsaicin solution to induce bladder pain. Bladder pain was evaluated based on the number of respiratory arrests. The spinal cords (centered on the sixth lumbar vertebra (L6)) were then harvested and immunohistochemically stained for c-fos protein (spinal cord posterior horn), which is expressed during pain reception from peripheral nerves. As a result, an increase was observed in bladder pain (FIG. 17) and spinal cord c-fos positive cell count (FIG. 18) in the Control group. The increase tended to be inhibited, however, in the Muse group.

(4) Histopathological Examination of Bladders

On the 7th day after injection of Muse cells, the bladders were provided for histopathological examination by a common method. The parameters of urothelial degeneration/ablation, urothelial hyperplasia, inflammatory cell infiltration and hemorrhage were examined by hematoxylin-eosin (HE) staining, while collagen fibrosis was examined by Masson's trichrome (MT) staining. All of the staining was carried out according to common methods. In each of the HIC rat models, each of the tested parameters were scored on the following pharmacological grading scale, totaling the scores and dividing by the number to obtain the averages. The results are summarized in Table 4.

<Scores>
 0 Points: Normal (no change)
 1 Point: Mild (change localized in only part of the evaluated area)
 2 Points: Moderate ("between "moderate" and "severe")
 3 Points: Severe (clear changes over the entire evaluated area)

TABLE 4

| | Histopathological examination of bladder | | |
|---|---|---|---|
| | Sham (mean ± SE) | Control (mean ± SE) | Muse (mean ± SE) |
| Urothelial degeneration/ablation | 0.78 ± 0.17 | 1.33 ± 0.38 | 1.11 ± 0.13 |
| Urothelial hyperplasia | 0.00 ± 0.00 | 1.67 ± 0.27 | 1.11 ± 0.30 |
| Inflammatory cell infiltration | 0.00 ± 0.00 | 1.44 ± 0.27 | 1.44 ± 0.27 |
| Hemorrhage | 0.22 ± 0.25 | 1.11 ± 0.30 | 1.00 ± 0.27 |
| Collagen fibrosis | 0.22 ± 0.17 | 2.22 ± 0.17 | 1.78 ± 0.25 |

As shown in Table 4, of the examined parameters, urothelial degeneration/ablation and urothelial hyperplasia were reduced in the Muse cell group compared to the Control group. Collagen fibrosis was also reduced in the Muse cell group compared to the Control group.

These results indicate that an ameliorative effect on urinary function disorder and bladder pain in interstitial cystitis and bladder pain syndrome patients can be expected by intravenous administration of Muse cells.

INDUSTRIAL APPLICABILITY

The cell preparation and pharmaceutical composition of the present invention can be applied for amelioration and treatment of frequent urination and bladder pain by direct injection into the affected site of bladders or by intravenous injection, in a Hunner-type interstitial cystitis rat model.

All of the publications and patent literature cited herein are incorporated into the present specification in their entirety as reference. The specific embodiments of the present invention were explained in the present specification for the purpose of example, and it will be readily appreciated by a person skilled in the art that various modifications may be employed such as are not outside of the spirit and scope of the present invention.

The invention claimed is:

1. A method for ameliorating and/or treating interstitial cystitis in a subject in need thereof, the method comprising: intravenously administering to the subject a cell preparation comprising, as an active ingredient, pluripotent stem cells positive for SSEA-3 isolated from mesenchymal tissue of a body or cultured mesenchymal cells, wherein the pluripotent stem cells have all of the following properties:
   (i) CD105-positivity;
   (ii) low or non-existent telomerase activity;
   (iii) having the ability to differentiate into any of the three germ layers;
   (iv) exhibiting no neoplastic proliferation; and
   (v) having self-renewal ability.

2. The method according to claim 1, wherein the cell preparation comprises a cell fraction wherein the pluripotent stem cells positive for SSEA-3 have been concentrated by external stress treatment.

3. The method according to claim 1, wherein the pluripotent stem cells are CD117-negative and CD146-negative.

4. The method according to claim 1, wherein the pluripotent stem cells are CD117-negative, CD146-negative, NG2-negative, CD34-negative, vWF-negative and CD271-negative.

5. The method according to claim 1, wherein the pluripotent stem cells are CD34-negative, CD117-negative, CD146-negative, CD271-negative, NG2-negative, vWF-negative, Sox10-negative, Snail-negative, Slug-negative, Tyrp1-negative and Dct-negative.

6. The method according to claim 1, wherein the bladder disorder associated with the interstitial cystitis is selected from the group consisting of frequent urination, increased urinary motivation, urinary urgency, bladder pain, urethral pain, pelvic pain, perineal pain and coital pain.

7. The method according to claim 1, wherein the pluripotent stem cells have the ability to engraft into bladder tissue.

8. The method according to claim 1, wherein the pluripotent stem cells are administered to a patient suffering from interstitial cystitis at from approximately $1 \times 10^5$ cells/individual to approximately $1 \times 10^9$ cells/individual, as the therapeutically effective amount.

9. The method according to claim 1, wherein the pluripotent stem cell are administered to a patient suffering from interstitial cystitis in an amount of about $1 \times 10^5$ cells/kg to about $1 \times 10^8$ cells/kg by body weight per individual patient, as the therapeutically effective dose.

* * * * *